United States Patent
Arakawa et al.

(10) Patent No.: US 7,293,050 B2
(45) Date of Patent: Nov. 6, 2007

(54) REMOTE COPY SYSTEM

(75) Inventors: Hiroshi Arakawa, Sagamihara (JP); Kenta Ninose, Yokohama (JP); Yoshihiro Asaka, Odawara (JP); Yusuke Hirakawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 502 days.

(21) Appl. No.: 11/002,105

(22) Filed: Dec. 3, 2004

(65) Prior Publication Data
US 2005/0125618 A1 Jun. 9, 2005

Related U.S. Application Data

(63) Continuation of application No. 10/796,175, filed on Mar. 10, 2004, now Pat. No. 7,085,788.

(30) Foreign Application Priority Data
Dec. 3, 2003 (JP) .............................. 2003-403970

(51) Int. Cl.
*G06F 17/30* (2006.01)
(52) U.S. Cl. ...................... 707/204; 707/201; 707/203
(58) Field of Classification Search ............. 707/1–10, 707/200–204; 711/112–114, 147–154; 714/6, 714/13
See application file for complete search history.

(56) References Cited

U.S. PATENT DOCUMENTS

| 5,404,548 A | 4/1995 | Nishioka |
| 5,577,240 A | 11/1996 | Demers et al. |
| 5,603,003 A | 2/1997 | Akizawa |
| 5,623,599 A | 4/1997 | Shomler |
| 5,926,816 A | 7/1999 | Bauer et al. |
| 5,937,414 A * | 8/1999 | Souder et al. ............. 707/203 |

(Continued)

FOREIGN PATENT DOCUMENTS

EP 0672985 9/1995

(Continued)

OTHER PUBLICATIONS

SDRF/Asynchronous: A Technical Description, EMC White Paper, EMC Corporation, Feb. 2004, pp. 1-13.

(Continued)

*Primary Examiner*—Yicun Wu
(74) *Attorney, Agent, or Firm*—Mattingly, Stanger, Malur & Brundidge, P.C.

(57) ABSTRACT

In a system in which data employed by a computer is stored in a storage system, the storage system transfers this data to another storage system and a copy of the data is maintained in the other storage system, consistency of the copy is maintained even in the case of data written to the storage system by a computer, to which a write time is not applied.

A source storage system, when a write time is applied to a write request, records the write time and applies this write time to the received write data and, when no write time is applied, applies the recorded write time to the received write data and transfers the write data with this write time applied thereto, to another storage system. The target storage system stores the write data in a logical volume in the target storage system in accordance with the write time.

94 Claims, 14 Drawing Sheets

U.S. PATENT DOCUMENTS

| | | |
|---|---|---|
| 5,996,054 A | 11/1999 | Ledain et al. |
| 6,092,066 A | 7/2000 | Ofek |
| 6,157,991 A | 12/2000 | Arnon |
| 6,209,002 B1 | 3/2001 | Gagne et al. |
| 6,260,124 B1 | 7/2001 | Crockett et al. |
| 6,353,878 B1 | 3/2002 | Dunham |
| 6,366,987 B1 | 4/2002 | Tzelnic et al. |
| 6,408,370 B2 | 6/2002 | Yamamoto et al. |
| 6,449,622 B1 | 9/2002 | LaRue et al. |
| 6,463,501 B1 | 10/2002 | Kern et al. |
| 6,516,327 B1 | 2/2003 | Zondervan et al. |
| 6,581,143 B2 | 6/2003 | Gagne et al. |
| 6,647,474 B2 | 11/2003 | Yanai et al. |
| 6,658,434 B1 | 12/2003 | Watanabe et al. |
| 6,658,542 B2 | 12/2003 | Beardsley et al. |
| 6,665,781 B2 | 12/2003 | Suzuki et al. |
| 6,816,951 B2 | 11/2004 | Kimura et al. |
| 6,823,347 B2 | 11/2004 | Chandrasekaran |
| 6,898,685 B2 | 5/2005 | Meiri et al. |
| 2002/0078296 A1 | 6/2002 | Nakamura |
| 2003/0050930 A1 | 3/2003 | Mosher, Jr. et al. |
| 2003/0051111 A1 | 3/2003 | Nakano et al. |
| 2003/0078903 A1 | 4/2003 | Kimura |
| 2003/0177321 A1 | 9/2003 | Watanabe |
| 2003/0188116 A1 | 10/2003 | Suzuki et al. |
| 2004/0024975 A1 | 2/2004 | Morishita et al. |
| 2004/0078399 A1 | 4/2004 | Tabuchi et al. |
| 2004/0128442 A1 | 7/2004 | Hinshaw et al. |
| 2004/0148477 A1 | 7/2004 | Cochran |
| 2004/0193802 A1 | 9/2004 | Meiri et al. |
| 2004/0193816 A1 | 9/2004 | Meiri et al. |
| 2004/0250030 A1 | 12/2004 | Ji |
| 2004/0250031 A1 | 12/2004 | Ji |
| 2004/0260972 A1 | 12/2004 | Ji |
| 2004/0267829 A1 | 12/2004 | Hirakawa et al. |
| 2004/0268177 A1 | 12/2004 | Ji |
| 2005/0033828 A1 | 2/2005 | Watanabe |
| 2005/0066122 A1 | 3/2005 | Longinov et al. |
| 2005/0091415 A1 | 4/2005 | Armitano |
| 2005/0102554 A1 | 5/2005 | Zohar |
| 2005/0120056 A1 | 6/2005 | Meiri et al. |
| 2005/0120092 A1 | 6/2005 | Nakano |
| 2005/0125617 A1 | 6/2005 | Ninose et al. |
| 2005/0132248 A1 | 6/2005 | Lecrone et al. |
| 2005/0149666 A1 | 7/2005 | Meiri et al. |
| 2005/0149817 A1 | 7/2005 | Biran et al. |
| 2005/0198454 A1 | 9/2005 | Yoder et al. |

FOREIGN PATENT DOCUMENTS

| | | |
|---|---|---|
| EP | 0674263 | 9/1995 |
| EP | 0672985 | 5/1998 |
| EP | 1150210 | 10/2001 |
| EP | 1217523 | 6/2002 |
| EP | 1538527 | 6/2005 |
| JP | 06-149485 | 5/1994 |
| JP | 672985 | 5/1998 |
| JP | 1150210 | 10/2001 |
| WO | 01/16748 | 3/2001 |
| WO | 2005/031578 | 4/2005 |

OTHER PUBLICATIONS

Storage.com. "The Role of Backup in Data Recovery", pp. 1-3.

* cited by examiner

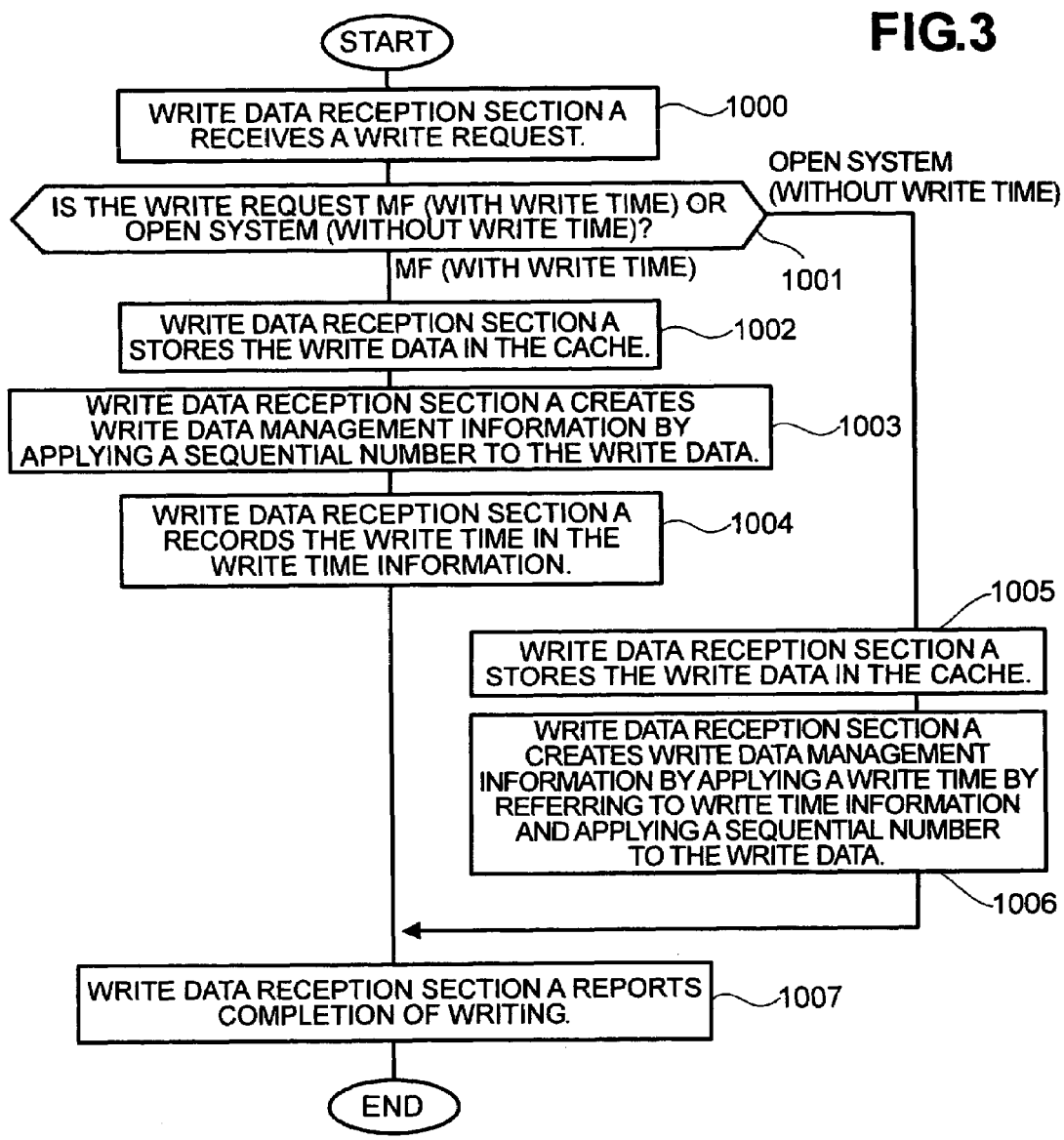
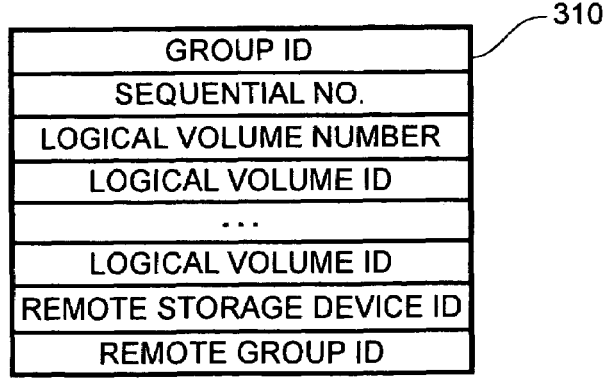

REMOTE COPY SYSTEM

CROSS-REFERENCES TO RELATED APPLICATIONS

This is application is a continuation of U.S. patent application Ser. No. 10/796,175, filed Mar. 10, 2004, now U.S. Pat. No. 7,085,788.

BACKGROUND OF THE INVENTION

1. Field of the Invention

The present invention relates to a storage system that stores data that is employed by a computer and that receives updating of data from a computer, and in particular relates to processing for maintaining copies of data between a plurality of storage systems.

2. Description of the Related Art

In Laid-open European Patent Application No. 0672985, a technique is disclosed whereby the data that is employed by a computer is stored by a storage system and a copy of this data is stored in a separate storage system arranged at a remote location, while reflecting the write sequence of the data. In the processing indicated in Laid-open European Patent Application No. 0672985, the source storage system that has received the write data from the primary host computer reports completion of reception of the write data to the primary host computer only after reception of the write data. After this, the primary host computer reads a copy of the write data from the source storage system. A write time, which is the time at which the write request in respect of the write data was issued, is applied to this write data and, when the write data is read by the primary host computer, the write time is also transferred to the primary host computer. In addition, the primary host computer transfers the write data and the write time to the secondary host computer. After receiving the write data and the write time, the secondary host computer writes information including the write time to a control volume in the storage system on the secondary side and, in addition, writes the write data in the target storage system in the write time sequence, with reference to the write times at which the various items of write data were presented. By writing the write data in the target storage system in the write time sequence, it is possible to maintain consistent data in the target storage system.

If write data were to be reflected to the target storage system neglecting the write sequence (the operation of storing write data in the target storage system will hereinbelow be referred to as "reflecting" the data), for example in the case of a bank account database, in processing to transfer funds from an account A to an account B, it would not be possible to reproduce the debiting of the account A and the crediting of the account B as a single transaction and it would be possible for example for a period to occur in the target storage system in which the balance of the account B was credited before debiting of the balance of the account A. If, in this case, some fault occurred in the source storage system rendering it unusable prior to debiting the balance of the account A in the target storage system, mismatching data would be left in the target storage system, with the result that incorrect processing would be performed if business were to be subsequently continued using the secondary host computer. Consequently, by storing the write data in the target storage system preserving the write sequence, consistent data can be maintained, making it possible to guarantee correctness of a sequence of related operations in respect of related data.

U.S. Pat. No. 6,092,066 discloses a technique whereby the data that is used by a computer is stored in a storage system and, by copying the data that is stored in this storage system to a separate storage system arranged at a remote location, the data can be maintained in the separate storage system even if the first storage system has become unusable due to for example a natural disaster or fire.

U.S. Pat. No. 6,209,002 discloses a technique whereby data employed by a computer is stored in a storage system and, by copying the data that is stored in this storage system to a separate storage system arranged at a remote location, and additionally copying the data that has been received by this separate storage system to a third storage system, a high level of redundancy can be obtained in respect of data.

SUMMARY OF THE INVENTION

In the technique that is disclosed in Laid-open European Patent Application No. 0672985, consistency of the copy of data stored in the target storage system cannot be maintained unless the host computer applies a write time to the write data, since the write sequence is maintained using the write time applied to the write data by the host computer when the write data from the host computer is reflected to the target storage system. In the case of a so-called mainframe host computer, the write time is applied to the write request, but, in the case of a so-called open system host computer, the write time is not applied to the write request. Consequently, in the technique disclosed in Laid-open European Patent Application No. 0672985, consistency of the copy of the data stored in the target storage system with I/O from an open system host computer cannot be maintained.

Also in the case of U.S. Pat. No. 6,092,066 and U.S. Pat. No. 6,209,002, there is no disclosure concerning maintenance of consistency of a copy of data stored in a target storage system when the host computers include an open system host computer.

Accordingly, in a computer system in which data that is employed by computer is stored in a storage system and the data that is stored in this storage system is transferred to a separate storage system so that a copy of the data is also held in this separate storage system, there is herein disclosed a technique for maintaining consistency of the copy of the data stored in the separate storage system (i.e. the target storage system) even in respect of data written to the storage system by a host computer that does not apply a write time to the write data, such as an open system host computer.

The system comprises a first storage device system having a first logical volume coupled to a computer and in which data received from the computer is stored and a second storage device system coupled to the first storage device system and having a second logical volume in which a copy of data stored in the first logical volume is stored.

The first storage device system applies time information to the write data received from the computer and sends the write data and this time information to the second storage device system; the second storage device system stores the write data received from the first storage device system in the second logical volume in accordance with the time information applied to this write data.

In a computer system in which data that is employed by computer is stored in a storage system and the data that is stored in this storage system is transferred to a separate storage system so that a copy of the data is also held in this separate storage system, it is thereby possible to maintain consistency of the copy of the data that is stored in the separate storage system (target storage system), even in the case of data stored in the storage system by a host computer that does not apply the write time to the write data, such as an open system host computer.

BRIEF DESCRIPTION OF THE DRAWINGS

FIG. 3 is a flow diagram showing an example of processing in the case where a write request is received by a storage device A;

FIG. 4 is a view showing an example of group management information;

DESCRIPTION OF THE PREFERRED EMBODIMENTS

Embodiments of the present invention are described below. However, it should be noted that the present invention is not restricted to the embodiments described below.

Embodiment 1

Figure 1:
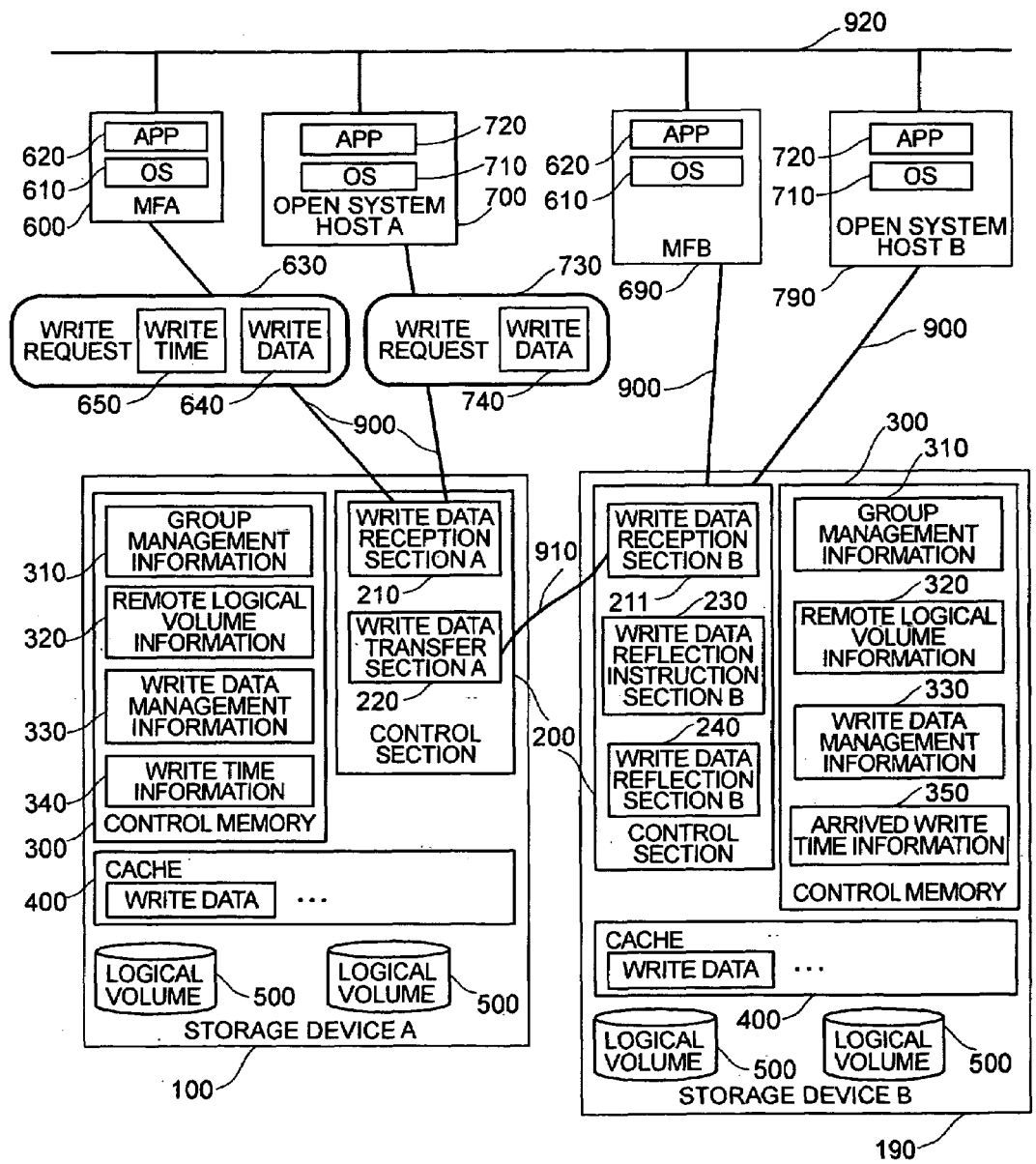
FIG. 1 is a view showing an example of the layout of a computer system according to embodiment 1.

FIG. 1 is a view showing an example of the layout of a computer system according to a first embodiment.

This system comprises a storage device (also referred to as a storage system) A100, a mainframe host computer A (also called MFA) 600, an open system host computer A700, a storage device B190, a mainframe host computer B (also referred to as MFB) 690 and an open system host computer B790. The storage devices A 100 and MFA 600 and the open system host A 700 are respectively connected by I/O paths 900. The storage device B 190 and MFB 690 and open system host B 790 are also respectively connected by I/O paths 900. The MFB 690 and open system host B 790 are normally a standby system. The MFA 600, MFB 690 and open system host A 700 and open system host B 790 are connected by a network 920.

The MFA 600 and MFB 690 include an OS 610 and application software (APP) 620. Also, the open system host A 700 and open system host B 790 likewise include an OS 710 and APP 720. An I/O request issued from the APP of the MFA 600, MFB 690, open system host A 700, or open system host B 790 through the OS is issued to the storage device A 100 or storage device B 190 through the I/O path 900. In this case, software such as a DBMS is included in the APP 620 or APP 720.

The storage device A 100 comprises a control section 200, control memory 300 and cache 400. The control section 200 comprises a write data reception section A 210 and write data transfer section A 220. The control section 200 accesses the control memory 300 and performs the following processing, utilizing the information stored in the control memory 300. The cache 400 comprises high-speed memory that chiefly stores the read data or write data so that the storage device A can achieve a high I/O processing performance by employing the cache 400. It should be noted that, preferably, these components are duplicated and provided with back-up power sources, for purposes of fault resistance and availability.

The storage device B 190 also comprises a control section 200, control memory 300 and cache 400. The control section 200 comprises a write data reception section B 211 and write data reflection instruction section 230 and write data reflection section 240. The role of the control memory 300 and cache 400 is the same as in the description of the storage device A 100 above.

The storage device A 100 and storage device B 190 provide logical volumes 500 constituting data storage regions in respect of the MFA 600, open system host A 700, MFB 690 and open system host B 790. It is not necessary that a single logical volume 500 should constitute the single physical device; for example it could be constituted by a set of storage regions dispersed on a plurality of magnetic disc devices. Also, a logical volume may have for example a mirror construction or a construction that has redundancy such as for example a RAID construction, in which parity data is added.

The storage device A 100 provides a logical volume 500 as described above; however, in the case of the MFA 600 and open system host A 700, the type of logical volume 500 that is provided is different from that provided in the case of the storage device A 100; also, the logical and/or physical interfaces of the I/O paths 900 are different. The same applies to the storage device B 190, MFB 690 and open system host B 790. The time of the write request 630 is included in the write request 630 from the MFA 600 as the write time 650, but is not included in the write request 730 from the open system host A 700.

The storage device A 100 and the storage device B 190 are connected by transfer paths 910. As will be described, the storage device A 100 and the storage device B 190 can hold a copy of the content of one logical volume in another logical volume. In this embodiment, a copy of the content of the logical volume 500 of the storage device A 100 is held in the logical volume 500 of the storage device B 190; the content of the updating performed on the logical volume 500 of the storage device A 100 is also stored in the logical volume 500 of the storage device B 190 by being sent to the storage device B 190 through the transfer path 910. As will be described, the storage device A 100 and the storage device B 200 hold management information regarding the copy, indicating the relationship between the logical volumes and maintenance of the copy referred to above is performed by using this management information. The relationship between the logical volumes and the relationship of the logical volume groups, to be described, is set by the user in accordance with the user's needs.

Figure 2:
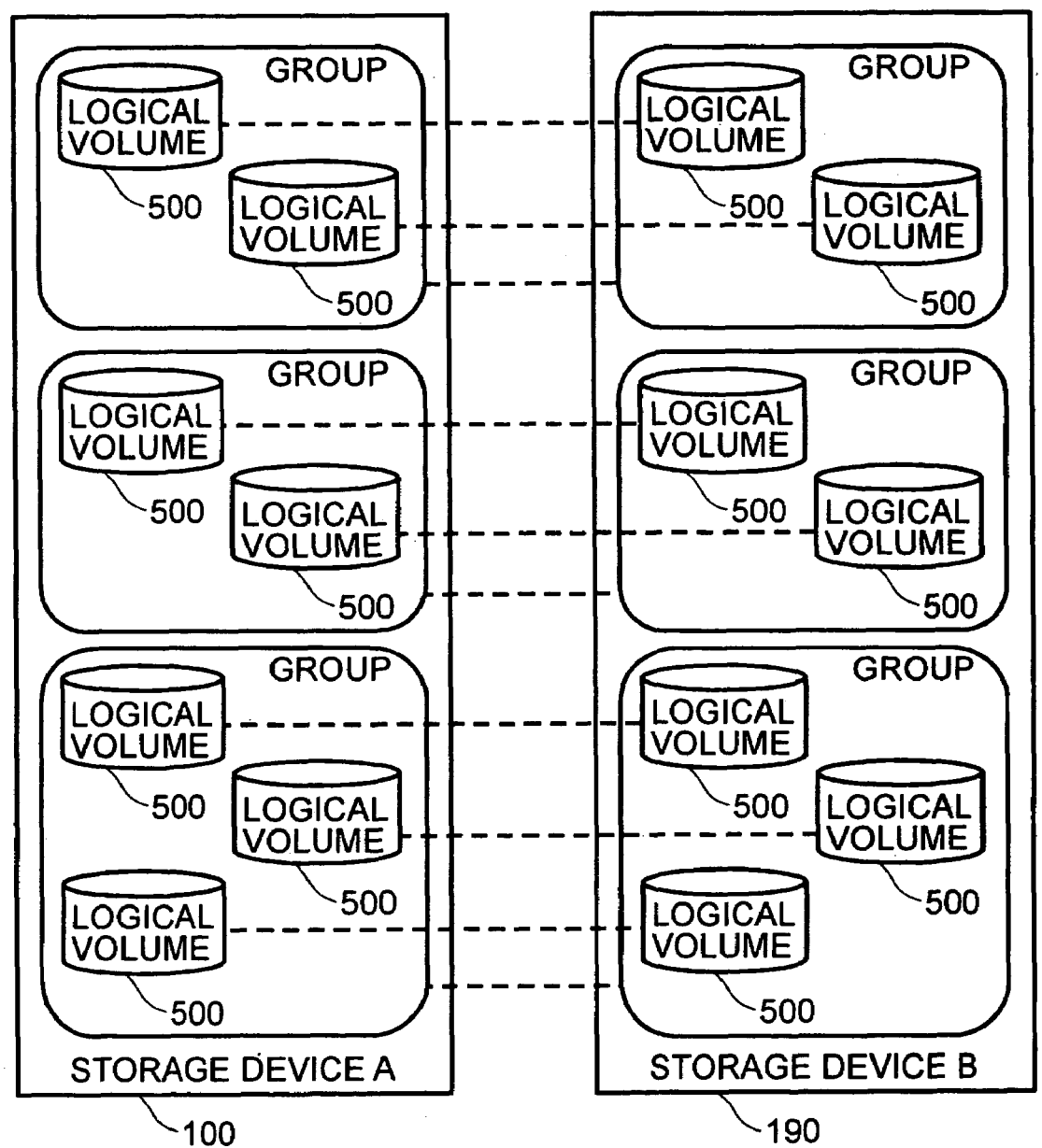
FIG. 2 is a diagram showing an example of a logical volume group.

In this embodiment, the relationships between the logical volumes are grouped. FIG. 2 is a diagram showing an example of a group of logical volumes. The broken lines indicate the copy relationship between the logical volumes 500 or between the logical volume groups i.e. the correspondence relationship of the source and target. In this embodiment, the sequence of write data in the storage device A 100 and reflection in the storage device B 190 are managed in units of logical volume groups comprising a plurality of such logical volumes and allocation of the necessary resources for processing as described above is also performed in units of logical volume groups.

If these are performed for each of the individual logical volumes, the large number of items to be managed makes the management process complicated and there is also a possibility of the resources required for this processing being increased, due to the large number of items to be processed. On the other hand, if the entire storage device A 100 is treated as a unit, detailed management can no longer be performed. In particular, since demands such as performance in regard to the logical volumes 500 differ greatly between a mainframe host and an open system host, it is desirable to arrange for example for manual control operations from the user in regard to processing and setting such as of tuning conditions to be accepted separately, by arranging for such hosts to perform processing separately, divided into respective groups. By setting up logical volume groups in this way, flexible copy processing management can be provided in response to the requirements of users or businesses.

Next, processing of writing of data onto each logical volume 500, transfer of data to a storage device B 190 and processing for reflection of data in the storage device B 190 will be described for the case where the logical volumes 500 that are used by the MFA 600 and the open system host A 700 are arranged to belong to different logical volume groups. By means of these processes, reflection to a copy is performed in write sequence between the various logical volumes of the storage device A 100 and, regarding consistency between copies, it is arranged that mutual consistency can always be maintained between the mainframe host data and open system host data.

FIG. 3 is a view showing the processing that is performed in the case where a write request is received from the MFA 600 or open system host A 700 in respect of a logical volume 500 (logical volume 500 constituting the source) where a copy of the logical volume 500 is being created. The write data reception section A 210 receives a write request from the MFA 600 or open system host A 700 (step 1000). If the write time 650 is included in the write request that is received (step 1001), the write data reception section A 210 stores the write data in the cache 400 (step 1002) and creates (step 1003) write data management information 330 by applying (assigning) a sequential number to the write data. The write data reception section A 210 then records the write time 650 in the write data management information 330. Also, when the sequential number is applied, the write data reception section A 210 obtains the sequential number from the group management information 310 of the logical volume group to which the logical volume that is being written belongs and records a value obtained by adding 1 thereto in the write data management information 330 as the sequential number of the write data, and records this new sequential number in the group management information 310.

FIG. 4 is a view showing an example of group management information 310 of the various logical volume groups. The group ID is the ID for identifying a logical volume group in the storage device A 100. The sequential numbers are numbers that are continuously given to write data in respect of a logical volume belonging to the logical volume group in question. Numbers successively increased by 1 in each case are applied to such write data, the initial value being for example 0. The logical volume number is the number of the logical volume that belongs to the logical volume group in question. The logical volume number is the ID of the logical volume belonging to the logical volume group in question in the storage device A 100. The remote storage device ID has a logical volume group that is paired with the logical volume group in question and is an ID (e.g. serial number) that specifies the storage device (in this embodiment, the storage device B 190) where a copy of the content of the logical volume belonging to the logical volume group in question is stored. The remote group ID is an ID that specifies the logical volume group that is paired with the logical volume group in question in the remote storage device (storage device B 190) i.e. the logical volume group to which the logical volume 500 (also called the remote logical volume) belongs in which a copy of the content of the logical volume belonging to the logical volume group in question is stored.

Figure 5:
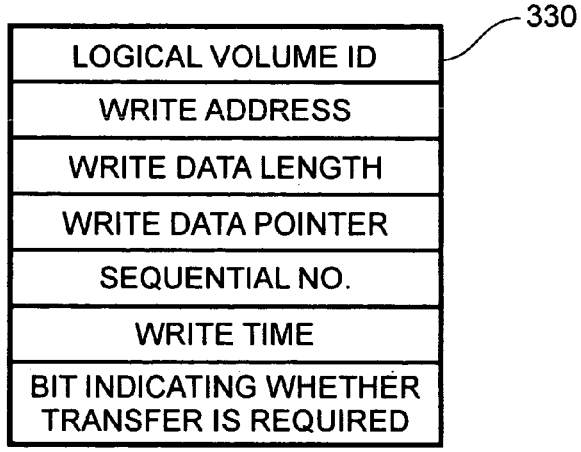
FIG. 5 is a view showing an example of write data management information for managing write data.

FIG. 5 is a view showing an example of write data management information 330 for managing the various write data. The logical volume ID is the ID of the logical volume in which the write data is stored. The write address is the write start address of the write data in question in the aforesaid logical volume. The write data length is the length of the write data in question. The write data pointer is the storage start address of the write data in question in the cache 400. The sequential numbers are numbers that are continuously given to write data in the logical volume group and to which the logical volume belongs in which the write data is written. The write time will be discussed below. The "transfer required" bit is a bit that indicates whether or not the write data in question needs to be transferred to the storage device B and is set to ON when write data management information 330 is created by receipt of write data by the write data reception section A 210. The write data management information 330 is managed in the form of a list for example for each logical volume group.

Returning to FIG. 3, in step 1004, the write data reception section A 210 records the write time 650 as the write time information 340 in the control memory 300.

If, in step 1001, no write time is included in the write request, the write data reception section A 210 stores the write data in the cache 400 (step 1005) and obtains from the write time information 340 a write time, which it applies (assigns) to the write data, and creates write data management information 330 (step 1006) by applying a sequential number obtained from the group management information 310. At this time, the write data reception section A 210 then records the time at which the write time information 340 was recorded, as the write time of the write data management information 300, and finds a sequential number by the same procedure as in the case of step 1003 described above and records this sequential number in the write data management information 300.

Finally, in step 1007, completion of writing is reported to the MFA 600 or to the open system host A 700. The aforesaid processing does not include the time-consuming processing of physically writing the write data that is stored in the cache 400 to the recording medium of the logical volume 500 or of transferring the write data to the storage device B 190; this processing is performed subsequently in asynchronous fashion, with an appropriate timing. Consequently, the time required until reporting of completion of writing after receiving the write request by the write data reception section A 210 need only be a short time, so rapid response to the MFA 600 or open system host A 700 can be achieved.

Figure 6:
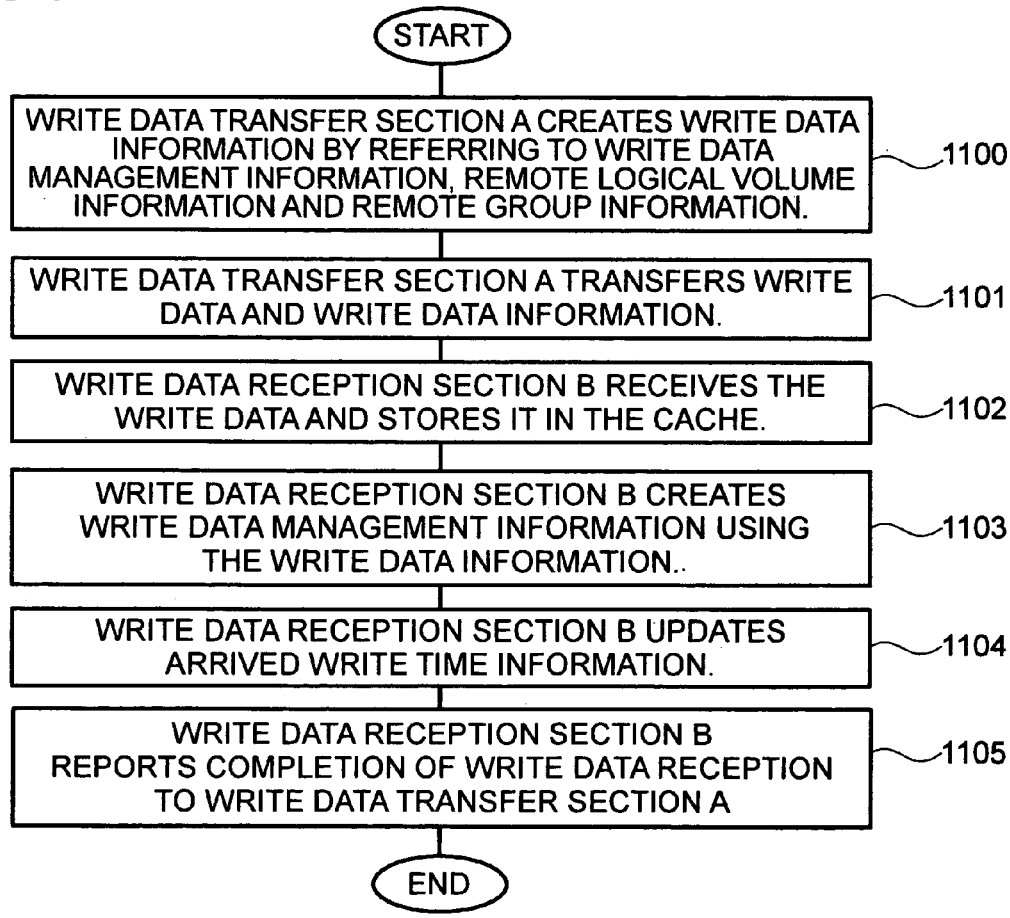
FIG. 6 is a flow diagram showing an example of transfer processing of write data from the storage device A to a storage device B;.

FIG. 6 is a view showing an example of transfer processing of write data to the storage device B 190 from the storage device A 100. The write data transfer section A 220 finds (step 1100) the information relating to the write data that is transferred to the storage device B 190 by referring to the list of the write data management information 330 to find the write data that needs to be transferred and, in addition, referring to the write data management information 330, group management information 310 and remote logical volume information 320. This information includes the write address acquired from the write data management information 330, the write data length, the sequential number, the write time, the remote storage device ID acquired from the remote logical volume information 320, the remote logical volume number, and the remote group number obtained from the group management information 310 using the logical volume ID.

Figure 7:
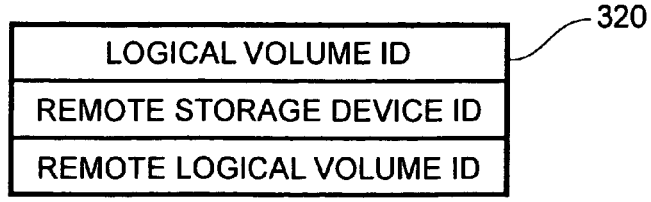
FIG. 7 is a view showing an example of remote logical volume information of a logical volume.

FIG. 7 is a view showing an example of the remote logical volume information 320 of the various logical volumes. The logical volume ID is the ID of the logical volume on the source side (logical volume 500 included in the storage device A 100 in embodiment 1). The remote storage device ID is an ID (for example a serial number) specifying the storage device (storage device B 190 in embodiment 1) having the logical volume (also called the remote logical volume) in which is stored a copy of the data stored by the logical volume in question that is paired with the logical volume in question. The remote logical volume ID is an ID that specifies the remote logical volume (i.e. the logical volume 500 on the target side, where a copy of the data that was stored in the logical volume is stored) in the remote storage device (storage device B 190 in embodiment 1).

Next, returning to FIG. 6, the write data transfer section A 220 transfers (step 1101) to the storage device B 190 the write data and the information found in step 1100. The write data reception section B 211 of the storage device B stores (step 1102) the received write data and information in the cache 400 and creates (step 1103) write data management information 330 from the received information. The items of the write data management information 330 of the storage device B 190 are the same as the items of the write data management information 330 of the storage device A 100. The content of the write data management information 330 of the storage device B 190 differs from that of the write data management information 330 of the storage device A 100 in that the logical volume ID is the ID of the logical volume 500 on the target side where the copy is stored and the write data pointer is the storage start address of the write data in the cache 400 of the storage device B 190 and the "transfer needed" bit is normally OFF, but is otherwise the same.

The storage device B 190 also has group management information 310, but the items thereof are the same as in the case of the storage device A 100. Regarding the content of the group management information 310, the group ID is an ID that specifies the logical volume group to which the logical volume 500 on the side of the target where the copy is stored belongs, the remote storage device ID is the ID of the storage device (storage device A 100 in the case of embodiment 1) constituting the source and the remote group ID is an ID that specifies the logical volume group to which the remote logical volume (i.e. the logical volume 500 constituting the source) belongs in the remote storage device (storage device A 100 in embodiment 1). The storage device B 190 also has remote logical volume information 320, but the items thereof are the same as in the case of the storage device A 100 and, regarding its content, the logical volume ID is an ID that specifies the logical volume 500 where the copy is stored, the remote storage device ID is an ID that specifies the ID of the storage device (storage device A 100) constituting the source and the remote logical volume ID is an ID that specifies the remote logical volume (logical volume 500 constituting the source) in the remote storage device (storage device A 100).

Returning to FIG. 6, next, the write data reception section B 211 updates the arrived write time information 350 (step 1104).

Figure 8:
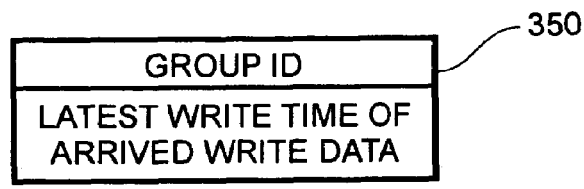
FIG. 8 is a view showing an example of arrived write time information.

FIG. 8 is a view showing an example of arrived write time information 350 of the various groups. The group ID is an ID that specifies the logical volume group in the storage device B 190. The latest write time of the arrived write data is the latest-time closest to the current time, of the write times applied to the write data received by the write data reception section of B 211, in respect of the logical volume groups of the storage device B 190. However, if it appears, from the sequential number order, that some of the write data has not yet arrived (some of the sequence of write data is missing), the latest time of the write time applied to these items of write data is recorded as the arrived write data time information, taking the continuous time comparison range in the order of the sequential numbers as being up to the final write data (write data immediately preceding the missing data).

In transfer of the write data between the write data transfer section A 220 and the write data reception section B 211, a plurality of items of write data may be simultaneously transferred in parallel. The write data is therefore not necessarily received in the write data reception section B 211 in the order of the sequential numbers but, as will be described, the write data is reflected in the order of the sequential numbers to each of the logical volume groups (i.e. it is stored in the logical volumes of the storage device B 190), so the write data is reflected to the copy in the order of updating (i.e. in the order of writing of the write data in the storage device A 100).

Returning once more to FIG. 6, finally, the write data reception section B 211 reports completion of reception of the write data to the write data transfer section A 220 (step 1105). The write data transfer section A 220 of the storage device A 100 that has received this write data turns the "transfer required" bit of the write data management information 330 OFF in respect of the write data corresponding to the report of completion of reception of write data. At this time, the storage device A 100 may discard from the cache the arrived write data that was held for transfer to the storage device B 190.

Figure 9:
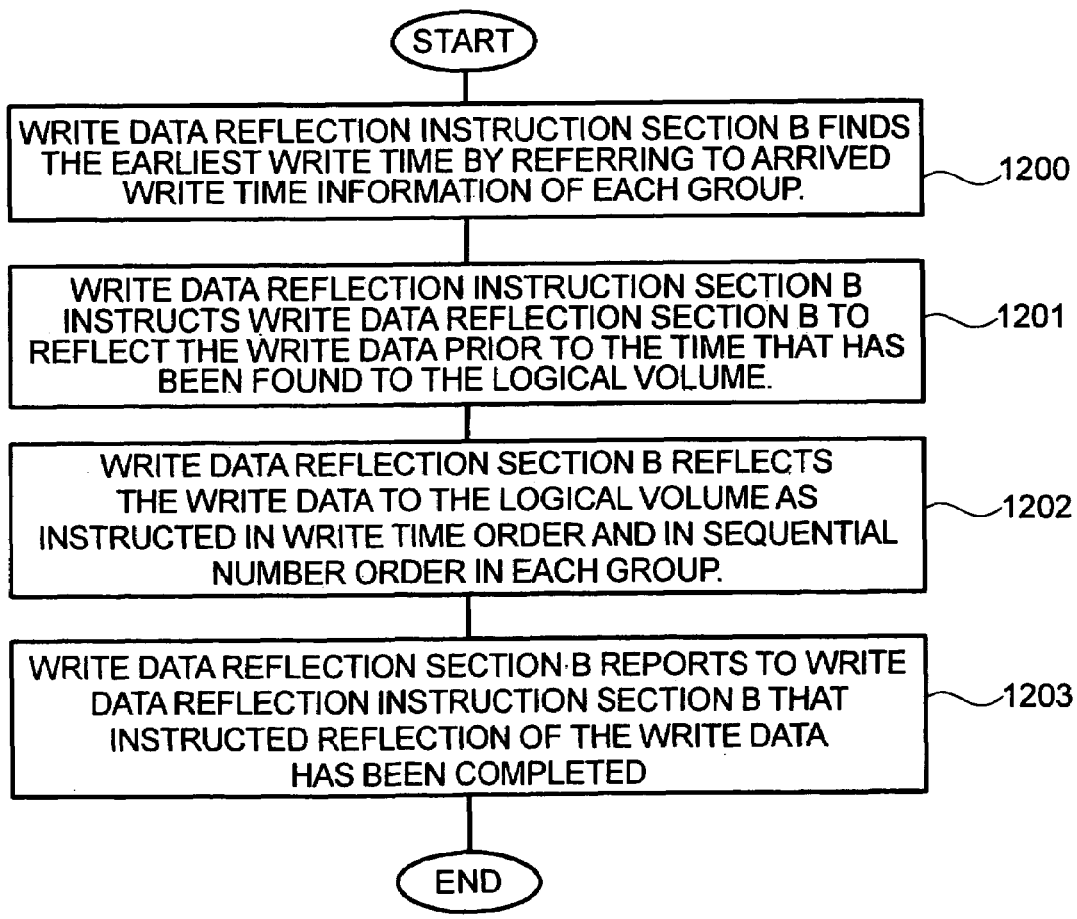
FIG. 9 is a flow diagram showing an example of reflection processing of write data in the storage device B.

FIG. 9 it is a view showing an example of the reflection processing of write data in the storage device B 190 (i.e. the processing of storage of the write data to the logical volume).

The write data reflection instruction section B 230 checks the arrived write time information 350 of all the logical volume groups of the storage device B 190 and finds, of these, the earliest time (step 1200). The write data reflection instruction section B 230 gives instructions (or permission) (step 1201) to the write data reflection section B 240 for reflection to these logical volumes of the write data whose write time is previous to the time that was thus found. When the write data reflection section 240 receives these instructions (or permission), by referring to the write data management information 330 and group management information 310, it reflects the write data in the designated time range (i.e. the write data whose write time is previous to the time found in step 1200), in the order of the write times, or, if these write times are the same, in the order of the sequential numbers in the various logical volume groups, in respect of the logical volume 500 in which the copy is stored (i.e. the write data is stored in the logical volume on the target side) (step 1202). After completion of reflection of all of the write data in the range specified in step 1202, the write data reflection section B 240 reports completion of the instructed processing (step 1203) to the write data reflection instruction section 230. The storage device B may discard the reflected write data from the cache 400.

By means of the above processing from step 1200 to step 1203, one of cycle of reflection processing is completed. The write data reflection instruction section B 230 and the write data reflection section B 240 repeat the above cycle in order to reflect the write data transferred from the storage device A continuously.

By means of the above processing, a copy of the updated *data of the storage device B 190 is stored maintaining the order between updating of data by the mainframe host and updating of data by the open system host. Regarding data consistency between the copies, mutual consistency can be maintained between the data of the mainframe host and the data of the open system host.

Specifically, the storage device A 100 utilizes the write time 650 contained in the write request 630 received from the mainframe host and applies a write time also to the write data received from the open system host and, furthermore, manages the received write data using both the write times and the sequential numbers. The target storage device B 190 designates the write data that is capable of being reflected (i.e. that is capable of storage in a logical volume on the target side) using the sequential numbers and the write times and stores the designated write data in a logical volume on the target side. As a result, even if buffering and/or transferring are provided in parallel mid-way, write order is maintained between the data written from the mainframe host and the data written from the open system host, so copy data can be stored in a logical volume of the storage device B 190 on the target side.

Also, even if some fault occurs in for example the storage device A 100, so that previously updated write data does not reach the storage device B 190, since the sequential numbers will not be continuous in respect of the write data of write times subsequent to the write time of the write data that failed to arrive, reflection thereof will not be allowed. Gaps of updating of data cannot therefore occur in the target side storage device B 190 and consistency between the source storage device A 100 and target storage device B 190 is ensured. As a result, even if a fault occurs in the source storage device A 100, business can be continued using the content of the logical volume 500 of the storage device B 190, which is matched with the MFB 690 and/or open system host B 790.

Also, since, in the above processing, write times are applied to all of the write data received by the storage device A 100, irrespective of whether the host that employs the data is a mainframe host or open system host, it is possible to ascertain information such as up to which write time the write data in any desired logical volume 500 has been transferred from the storage device A 100 to the storage device B 190 or has arrived at the storage device B 190 or has been reflected at the storage device B 190 (i.e. has been stored in a logical volume).

It should be noted that, in order to lighten the processing load in the above step 1202, the write data in the designated time range may be stored in the logical volume 500 that stores the copy in sequential number order in the various logical volume groups, neglecting the write time order. In this case, consistency between the copies (i.e. between the logical volumes of the storage device B 190 on the target side) is maintained by the timing of the reports of completion of processing in step 1203. If it is desired to hold consistent data of the period between a report of completion of processing and the next report of completion of processing, a snapshot of the logical volume 500 in which the copy is stored may be acquired with the timing of the report of completion of processing. The technique disclosed in for example U.S. Pat. No. 6,658,434 may be employed as a method of acquiring such a snapshot. In this method, the storage content of a logical volume 500 (source volume) in which is stored the data whereof a snapshot is to be acquired is copied to another logical volume 500 (target volume) of the storage device B 190, so that the updated content is reflected also to the target volume when the source of volume is updated. However, in this embodiment, once the snapshot of the source volume has been stored in the target volume, the content of the target volume is frozen and verified by stopping reflection at that time.

Also in the transfer processing of the above write data, it was assumed that, initially, the write data transfer section A 220 transfers the write data in respect of the write data reception section B 211; however, it would be possible for the write data reception section B 211 to initially issue a write data transfer request in respect of the write data transfer section 220 and for the write data transfer section A 220 to transfer the write data in respect of the write data reception section B 211 after having received this request. By employing write data transfer requests, the pace of transfer of write data can be adjusted in accordance with for example the processing condition or load of the storage device B 190 or the amount of write data that has been accumulated.

Also, in the above processing, it was assumed that the location of storage of the write data was the cache 400; however, by preparing a separate logical volume 500 for write data storage, the write data could be stored in this logical volume 500. In general, a logical volume 500 of large volume may be prepared in respect of the cache 400, so this makes it possible for more write data to be accumulated.

Figure 10:
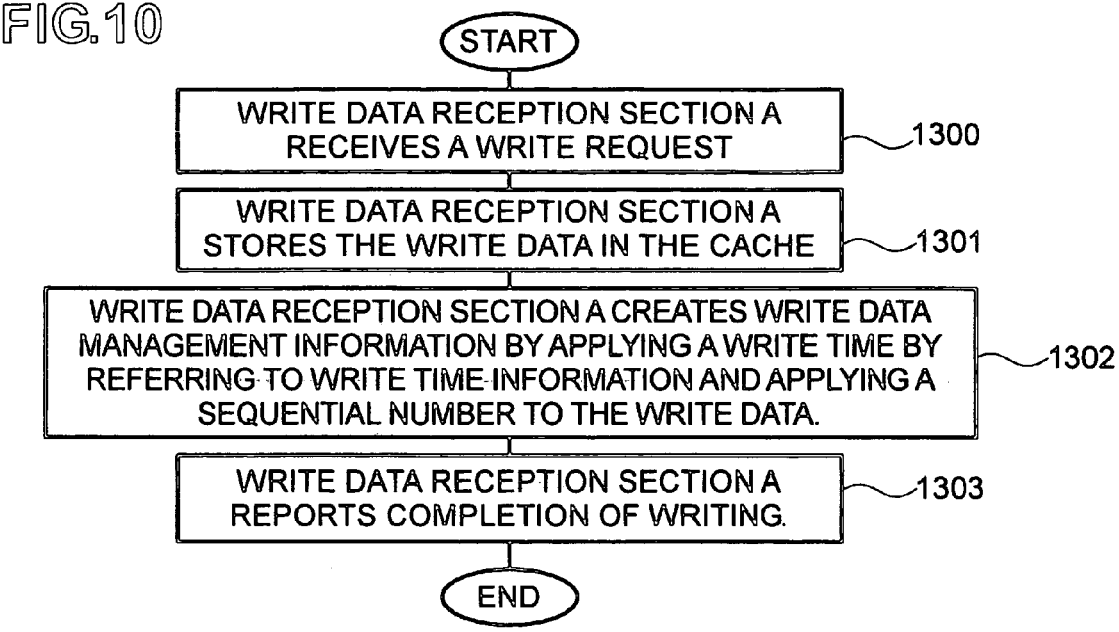
FIG. 10 is a flow diagram showing another example of processing in the case where the storage device A has received a write request.

Also, in the above processing, it was assumed that the write time information 340 was updated by the write time 650 of reception from the mainframe host; however, it may be arranged for the storage device A 100 to possess an internal clock and to constantly update the write time information 340 by reference to this clock. In this case, FIG. 10 shows an example of the processing that is executed when a write request in respect of a logical volume 500 (logical volume 500 constituting the source) where the storage device A 100 creates a copy is received from the MFA 600 or open system host A 700. This processing is processing corresponding to the processing shown in FIG. 3.

The write data reception section A 210 receives (step 1300) a write request from the MFA 600 or open system host A 700. The write data reception section A 210 stores (step 1301) the write data in the cache 400 and applies a write time to the write data by referring to the write time information 340 that is constantly updated in accordance with the clock provided in the storage device A 100, and creates (step 1302) write data management information 330 by applying a sequential number to the write data, by referring to the group management information 310. Finally, completion of writing is reported to the MFA 600 or open system host A 700 (step 1303).

Figure 11:
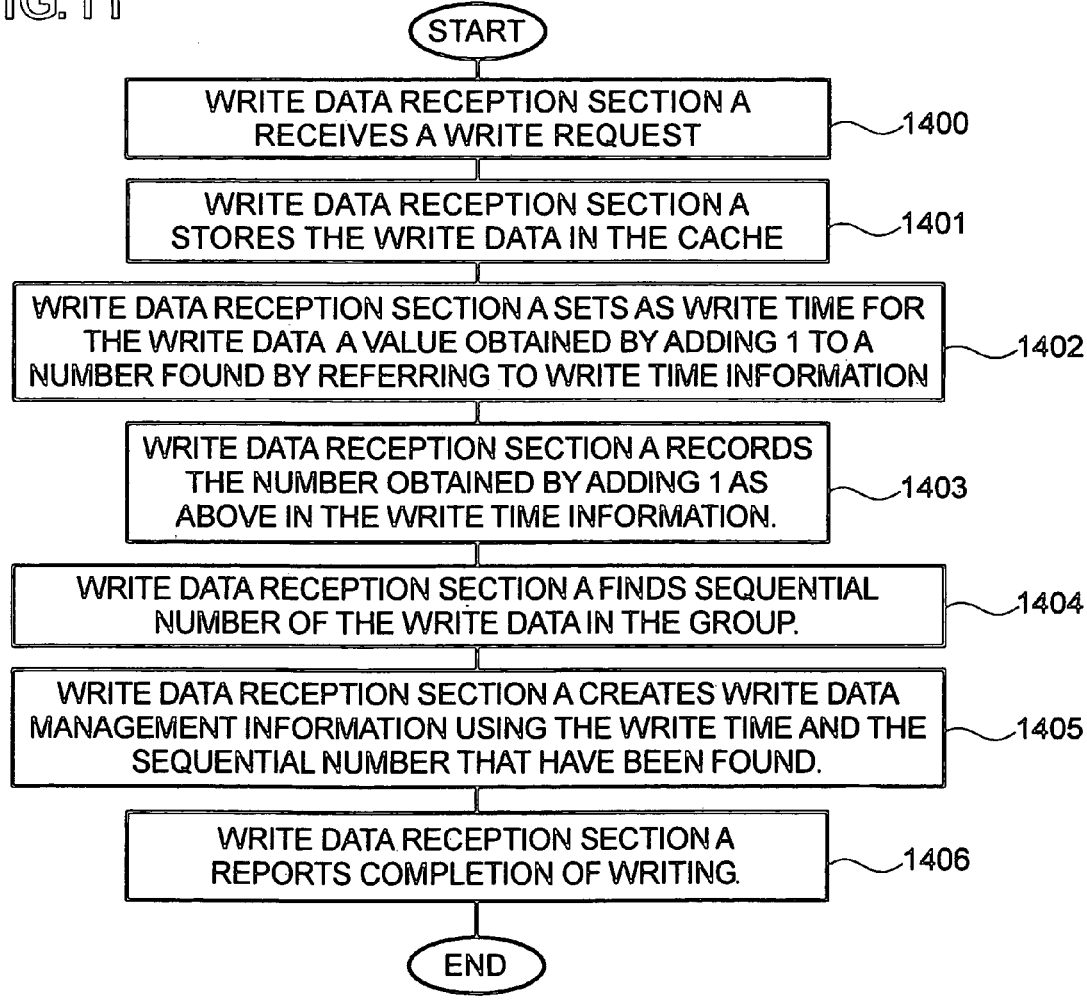
FIG. 11 is a flow diagram showing another example of processing in the case where the storage device A has received a write request.

Also, in the above processing, a time is used in the write time information 340 or the write time of the write data management information 300 or the arrived write time information 350; however, the time that is employed for this purpose need not necessarily be of the form of years, months, days, hours, minutes, seconds, milliseconds, microseconds, nanoseconds or a total of an ordinary time and instead a sequential number could be employed. In particular, FIG. 11 shows an example of the processing when the storage device A 100 has received a write request in respect of the logical volume 500 (logical volume 500 constituting the source), where the copy is created, from the MFA 600 or open system host A 700, in a case where the storage device A 100 itself updates the write time information 340. This processing is processing corresponding to FIG. 3 or FIG. 10. It should be noted that, in FIG. 11, the initial value of the write time information 340 may for example be 0 and numbers successively incremented by 1 may be applied to the write data as shown below as the write times.

The write data reception section A 210 receives a write request (step 1400) from the MFA 600 or open system host A 700. The write data reception section A 210 stores the write data in the cache 400 (step 1401), reads the number from the write time information 340 and applies to the write data (step 1402) as the write time the value obtained by incrementing this by 1. Then the write data reception section A 210 records the value after incrementing by 1 as the write time information 340, thereby updating the write time information 340 (step 1403). The write data reception section A 210 also creates the write data management information 330 (step 1405) by applying a sequential number to the write data (step 1404) by referring to the group management information 310. The write data reception section A 210 finally reports completion of writing (step 1406) to the MFA 600 or open system host A 700.

When a sequential number is employed as the write time in this manner, in the storage device B 190, instead of the write data reception section B 211 being arranged to update the arrived write time information 350 using the write time applied to the write data received and the write data reflection instruction section B 230 being arranged to designate the range of write data capable being stored in a logical volume of the storage device B by checking the arrived write time information 350 of the various logical volume groups, it may be arranged for the write data reflection section 240 to reflect (i.e. store) the write data arriving at the storage device B by referring to the sequential number recorded at the write time of the write data management information 330 in the logical volume 500 without skipping numbers in the number sequence.

Embodiment 2

Figure 12:
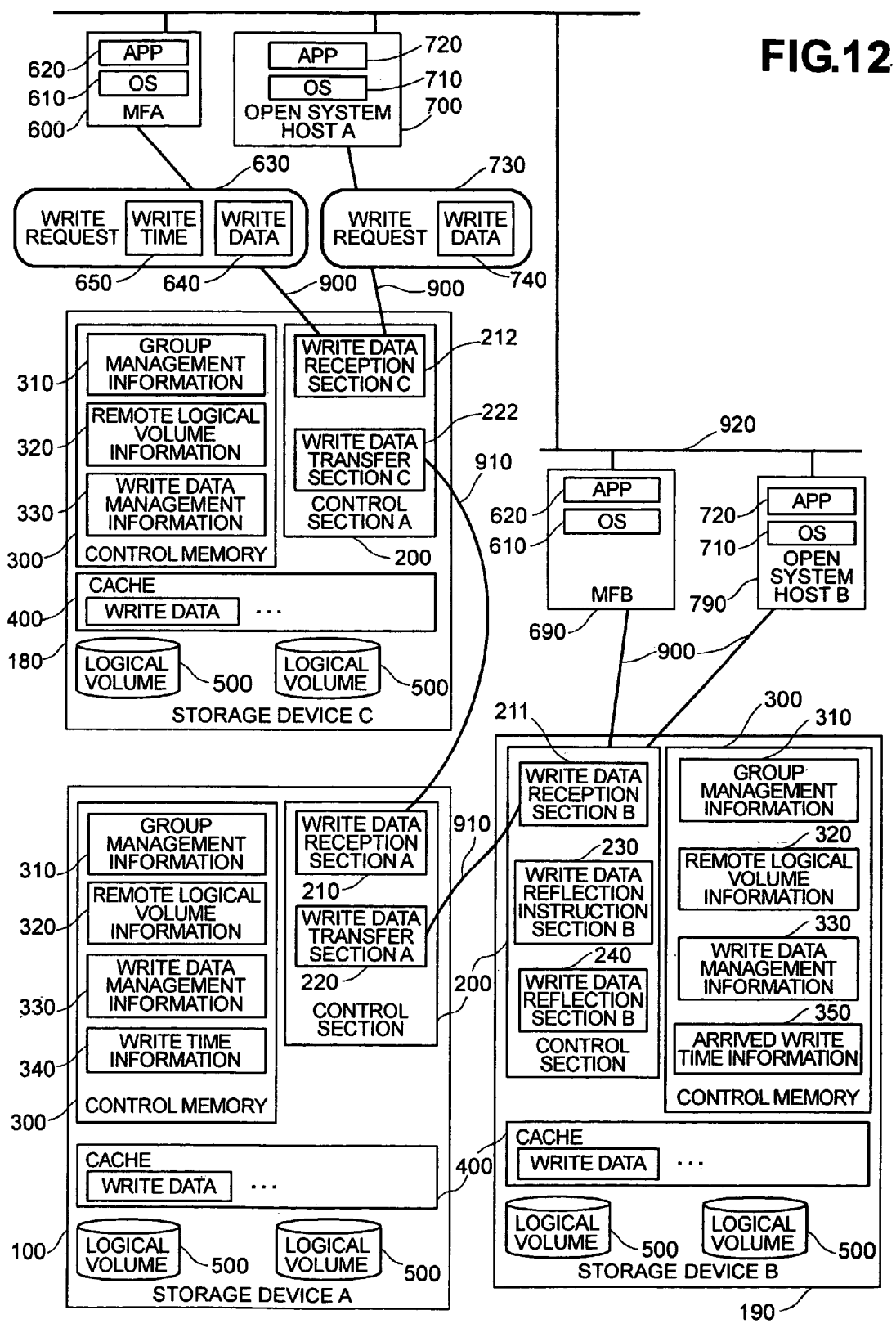
FIG. 12 is a view showing an example of the layout of a computer system according to embodiment 2.

FIG. 12 is a view showing an example of the layout of a computer system according to a second embodiment.

The differences with respect to embodiment 1 lie in that the MFA 600 and open system host A 700 are connected with the storage device C 180 through an I/O path 900 and the storage device C 180 is connected with the storage device A 100 through a transfer path 910. In this embodiment, a copy of the data stored in the logical volume 500 of the storage device C 180 is stored in a logical volume 500 of the storage device A 100. Further, a copy of the data stored in the logical volume 500 of the storage device A is stored in the logical volume 500 of the storage device B 190 in processing like the processing described in embodiment 1. That is, in this embodiment, a copy of the data stored in the logical volume 500 of the storage device C 180 is stored in the storage device A 100 and the storage device B 190. In order to implement such processing, the storage device C 180 is provided with the various items of information and a construction like that of the storage device A 100 described in embodiment 1.

When the storage device C 180 has received a write request 630 or a write request 730 for the logical volume 500 from the MFA 600 or open system host A 700, it stores the received write data 640 or write data 740 in a logical volume in the storage device C 180 and transfers this to the write data reception section A 210 of the storage device A 100. At this point, in contrast to the processing described in embodiment 1, the storage device C 180 sends notification of completion of writing to the MFA 600 or open system host A 700 after waiting for notification of completion of reception from the write data reception section A 210, and the storage device C 180 is thereby able to guarantee that a copy of the write data 640 or write data 740 that was written thereto is present in the storage device A 100. In this way, if for example due to the occurrence of some fault in the storage device C 180 or on the transmission path 910, transfer of data to the storage device A 100 has not succeeded, the MFA 600 or open system host A 700 will not deem write data that have not been transferred to the storage device A 100 to have been written but will only deem write data that have been received by the storage device A 100 to have actually been written; a copy as expected by the APP 620 on the MFA 600 or the APP 720 on the open system host A 700 will therefore exist on the storage device A 100. Furthermore, after all of the write data received by the storage device A 100 have been sent to the storage device B 190, a copy as expected will also exist on the storage device B 190, so, at the time where the processing executed by the MFA 600 or open system host A 700 was interrupted, the MFB 690 or open system host B 790 will be able to continue business using data as expected identical with the data that are recognized as having been written by the MFA 600 or open system host A 700.

As initially indicated in embodiment 1, when the write time information 340 is updated by the write time 650 applied to the write data, the write data reception section C 212 of the storage device C 100, if a write time 650 is included in the received write request 630, records the write time also in the write data management information 330 and the write data transfer section C 222 also transfers this write time to the write data reception section A 210 of the storage device A 100 when performing write data transfer. After receiving the write data and the write time, the write data reception section A 210 processes the write data and the write time received from the storage device C 180 by the same method as the processing of the write request 630 that was received from the mainframe host in embodiment 1; consistency between the copies stored in the logical volumes in the storage device A 100 is thereby maintained and consistency between the write data issued from the mainframe host and the write data issued from the open system host can thereby be maintained.

In this way, even if, due for example to a large-scale disaster, faults occur in both of the storage device C 180 and the storage device A 100, business can be continued using the consistent content of the logical volume 500 of the storage device B 190, which was matched with the MFB 690 and open system host B 790. As indicated in the final part of embodiment 1, when the write time information 340 is updated from the storage device A 100 itself, transfer of the write time from the storage device C 180 is unnecessary, so that, after receiving the write data from the storage device C 180, the write data reception section A 210 may perform processing on the write data like the processing of FIG. 11 indicated in the latter part of embodiment 1.

It should be noted that there may be a plurality of storage devices C 180 that connect to the storage device A 100.

Also, although not shown, if the mainframe host and open system host are connected by an I/O path with the storage device A 100, the mainframe host or open system host that is connected with the storage device A may continue the business that was being conducted by the MFA 600 or open system host A 700 using the consistent content of a logical volume 500 of the storage device A 100 that was matched therewith, in the event that a fault occurs in the MFA 600 or open system host A 700 or storage device C 180.

Embodiment 3

Figure 13:
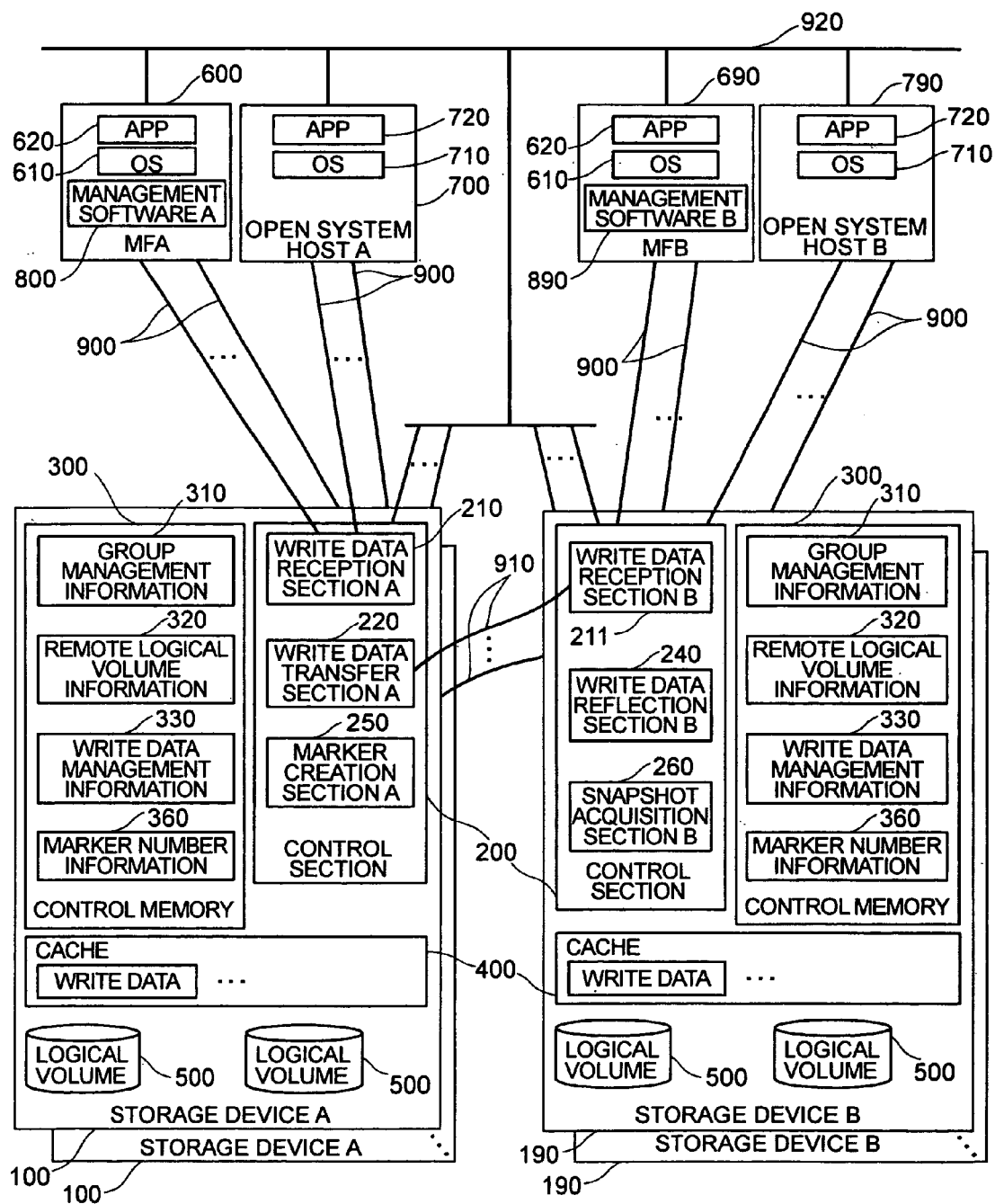
FIG. 13 is a view showing an example of the layout of a computer system according to embodiment 3.

FIG. 13 is a view showing an example of the construction of a computer system according to Embodiment 3.

The chief differences with respect to embodiment 1 lie in that there are a plurality of respective storage devices A 100 and storage devices B 190, the MFA 600 and open system host A 700 are connected through an I/O path 900 respectively with a plurality of storage devices A 100, the MFB 690 and the open system host B 790 are connected through an I/O path 900 respectively with a plurality of storage devices B 190, the MFA 600 includes management software A 800 and the MFB 690 includes management software B 890. Other differences will be described below.

Hereinbelow, the processing in respect of writing performed to the various logical volumes 500, transfer of write data to the storage device B 190 and the processing of reflection of write data in the storage device B 190 (i.e. storage of the write data in the logical volume) will be described in respect of the logical volumes 500 employed by the MFA 600 and the open system host A 700. This processing ensures that mutual consistency is maintained between the data of the mainframe host and the data of the open system host in regard to consistency between copies respectively stored in the plurality of logical volumes that are possessed by the plurality of storage devices B 190.

Figure 14:
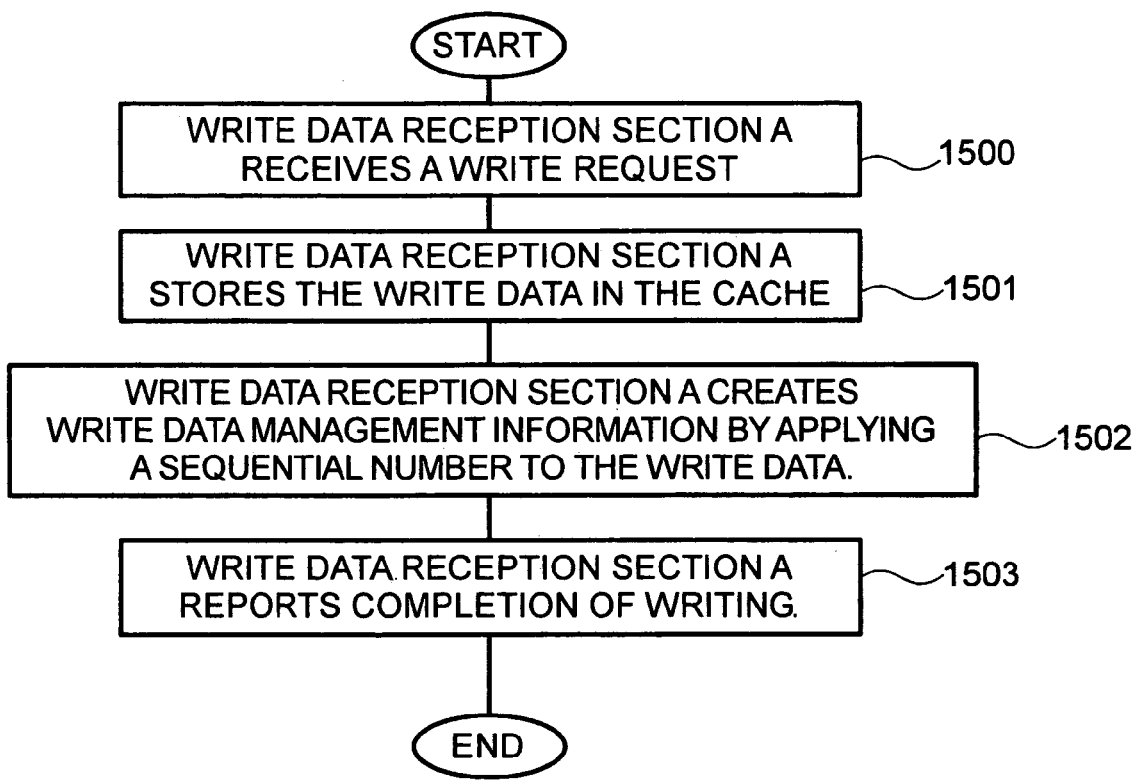
FIG. 14 is a flow diagram showing another example of processing in the case where the storage device A in embodiment 3 has received a write request.

FIG. 14 is a view showing an example of the processing when a write request in respect of the logical volume 500 (logical volume 500 constituting the source) in which a copy is created by the storage device A 100 is received from the MFA 600 or open system host A 700.

The write data reception section A 210 receives (step 1500) a write request from the MFA 600 or open system host A 700. The write data reception section A 210 stores the write data in the cache 400 (step 1501) or, as in embodiment 1, creates write data management information 330 (step 1502) by acquiring a sequential number by referring to the group management information 310. Finally, the write data reception section A 210 reports to the MFA 600 or open system host A 700 completion of writing (step 1503). The group management information 310 is the same as that in the case of embodiment 1. The write data management information 330 of this embodiment will be described later.

Figure 15:
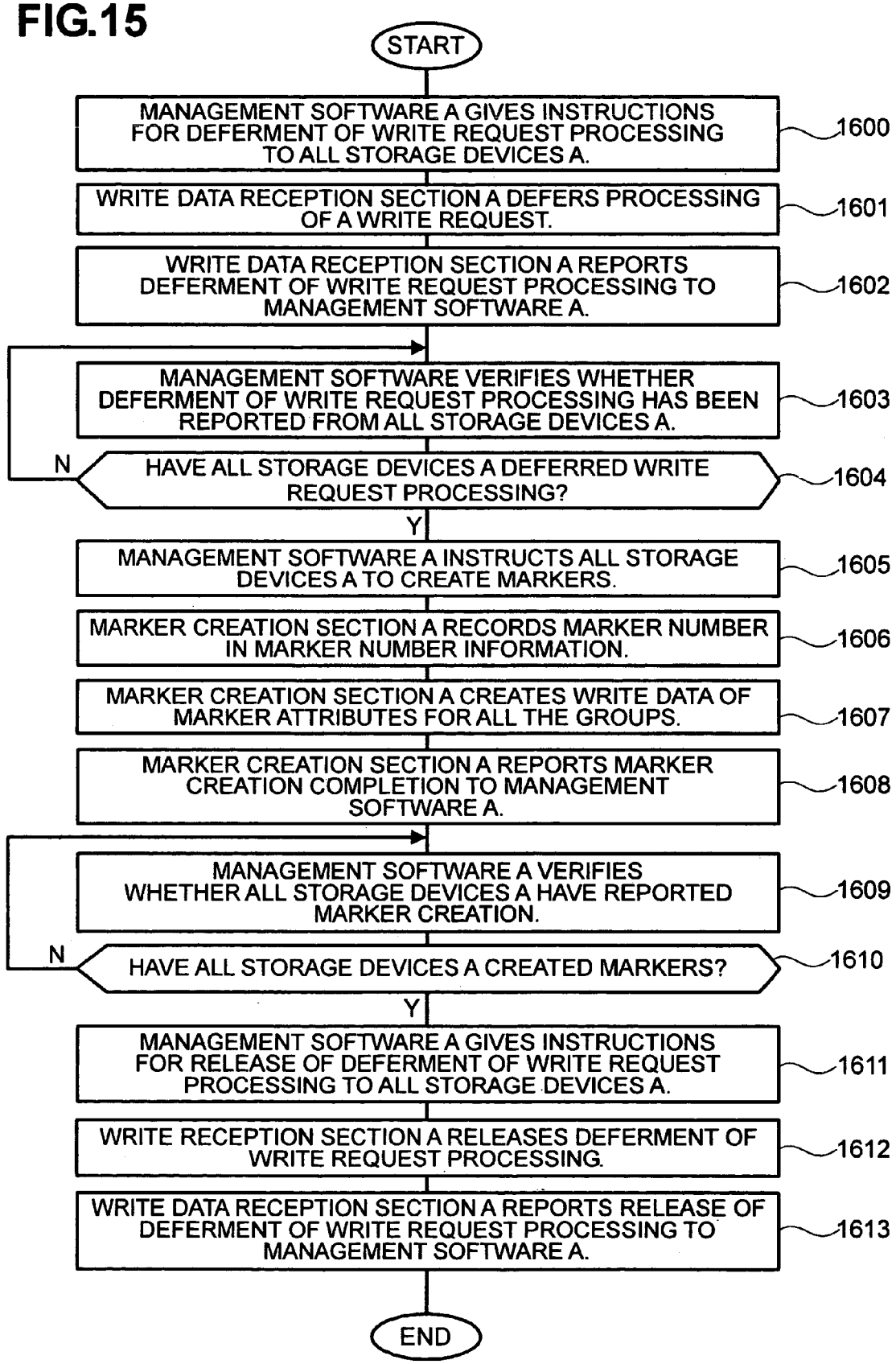
FIG. 15 is a flow diagram showing an example of processing in the case where the management software A gives, instructions for deferring processing of a write request in respect of the storage device A and creation of a marker.

FIG. 15 is a view showing an example of the processing when the management software A 800 gives instructions for deferment of processing of write requests in respect of the storage device A 100 and creation of a marker. As will be described later, consistency is established between the copies stored in the plurality of storage devices B 190 by subsequently performing synchronization of reflection to the copies, with the timing with which this processing was performed during updating of the logical volume 500 of the storage device A 100.

First of all, the management software A 800 gives instructions for deferment of processing of write requests to all of the storage devices A 100 (step 1600). On receipt of these instructions, the write data reception section A 210 defers processing of write requests (step 1601) and reports to the management software A 800 the fact that deferment has been commenced (step 1602). After the management software A 800 has confirmed that commencement of deferment has been reported from all of the storage devices A 100 that have been so instructed, processing advances to the following processing (step 1603 and step 1604).

Figure 16:
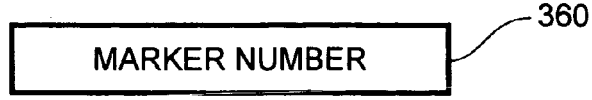
FIG. 16 is a view showing an example of marker number information.

Next, the management software 800 instructs all of the storage devices A 100 to create markers (step 1605). This instruction includes a marker number as a parameter. The marker number will be described subsequently. On receipt of this instruction, the marker creation section A 250 records the received marker number in the marker number information 360 shown in FIG. 16 stored in the control memory 300 (step 1606) and creates (step 1607) special write data (hereinbelow called a marker) for information transmission in respect of all of the logical volume groups. A marker is write data in which a marker attribute is set in the write data management information 300.

Figure 17:
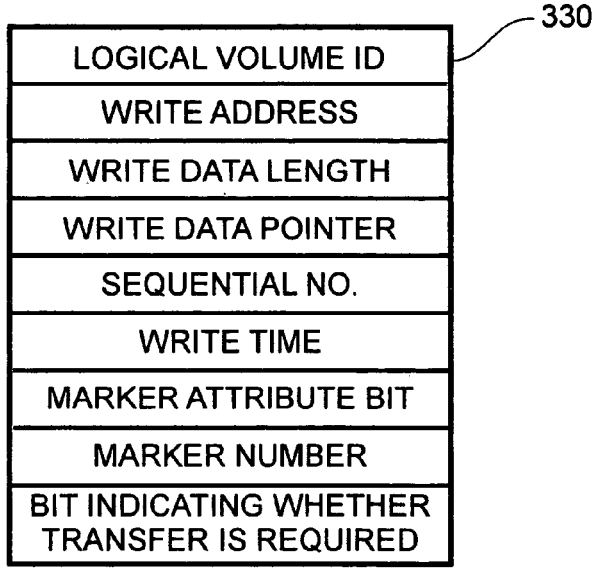
FIG. 17 is a view showing another example of write data management information.

FIG. 17 is a view showing an example of write data management information 330 of write data in this embodiment: a marker attribute bit and marker number are added to the write data management information 330 of embodiment 1.

The marker attribute bit is a bit indicating that the write data in question is a marker and is OFF in the case of ordinary write data but is set to ON in the case of a marker. A marker number as described above is set in the "marker number". The sequential number in the group is acquired and applied in respect of a marker in the same way as in the case of ordinary write data. Specifically, in marker creation, the marker creation section A 250 obtains a sequential number from the group management information 310 of the group in the same way as in the processing of the write data reception section A 210 and records a value obtained by adding 1 thereto in the write data management information 330 as the sequential number of the aforesaid marker, and records the new sequential number in the group management information 310. When the sequential number has been applied in this way to the marker, it is transferred to the storage device B 190 in the same way as in the case of ordinary write data, but the marker is not reflected to the logical volume 500.

The marker number is a number for identifying the instruction in response to which the marker was created; when a marker creation instruction is issued by the management software A 800, for example the initial value thereof is 0 and the marker number is incremented by 1 before being issued. The management software A 800 may confirm the current marker number by reading the marker number recorded in the marker number information 360.

Returning to FIG. 15, after the marker creation section A 250 has created a marker in respect of all of the logical volume groups, the marker creation section A 250 reports completion of marker creation to the management software A 800 (step 1608). After confirming that completion of marker creation has been reported from all of the designated storage devices A 100, the management software A 800 proceeds to the subsequent processing (step 1609, step 1610).

The management software A 800 gives instructions (step 1611) for cancellation of deferment of processing of write requests to all of the storage devices A 100. On receipt of these instructions, the write data reception section A 210 cancels deferment of processing of write requests (step 1612) and reports to the management software A 800 (step 1613) the fact that such deferment has been cancelled.

Figure 18:
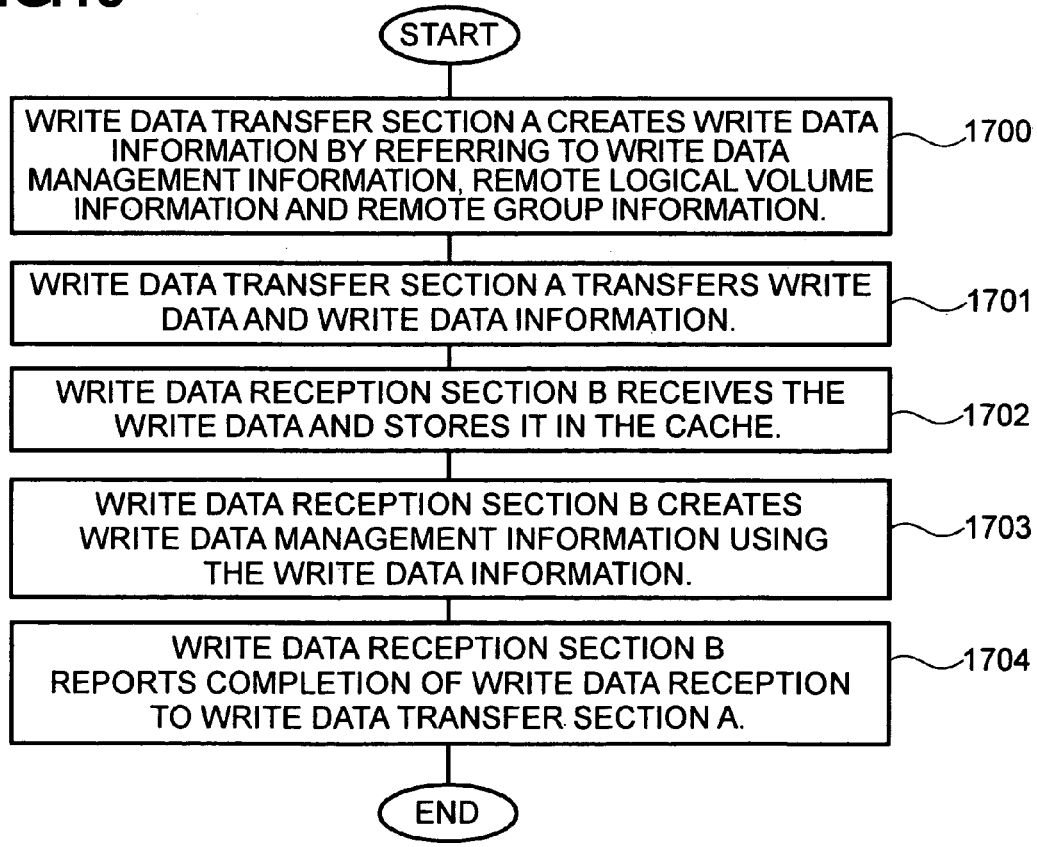
FIG. 18 is a flow diagram showing an example of transfer processing of write data from the storage device A in embodiment 3 to the storage device B.

FIG. 18 is a view showing an example of transfer processing of write data to a storage device B 190 from a storage device A 100. This processing is substantially the same as the transfer processing described in FIG. 6 of embodiment 1, but differs in that no updating of the arrived write time information 350 is performed by the write data reception section B 211. It should be noted that the write data management information 330 of the storage device B 190 is the same as the write data management information shown in FIG. 17, described above; in step 1703, the presence or absence of the marker attribute of the write data and/or the marker number recorded in the write data management information 330.

Figure 19:
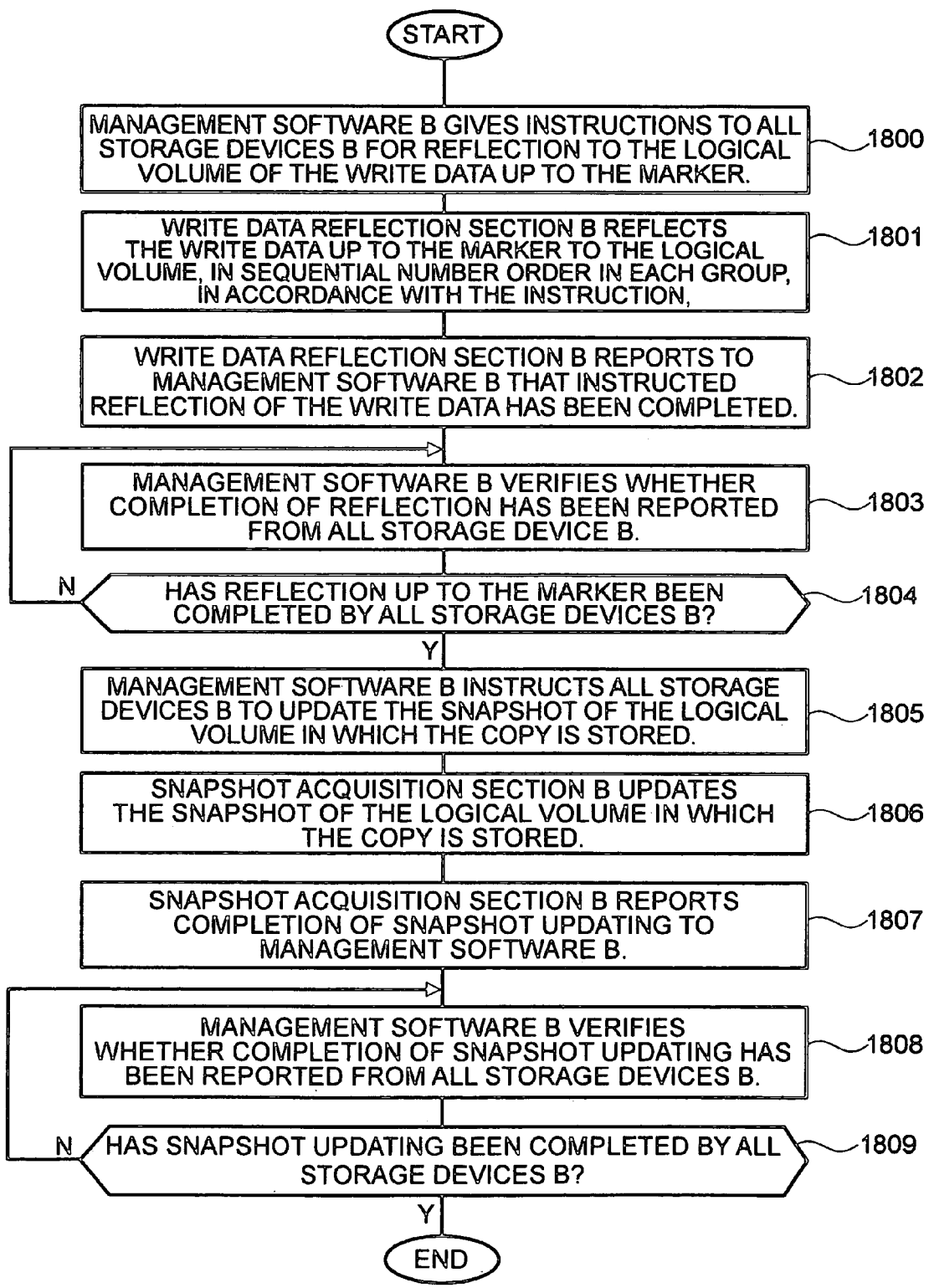
FIG. 19 is a flow diagram showing an example of reflection processing of write data in the storage device B in embodiment 3.

FIG. 19 is a view showing an example of the processing of reflection (storage) of write data to a logical volume in the storage device B 190. First of all, the management software B 890 gives instructions for reflection of the write data, as far as the marker, to the logical volume 500 in which a copy is stored (step 1800) to all of the storage devices B 190. After receiving such an instruction, the write data reflection section B 240 refers to the write data information 330 and group management information 310 and reflects (step 1801) the write data as far as the marker, in the sequential number order in each group, to the logical volume 500 in which the copy is stored. Specifically, the write data reflection section B 240 continues to store the write data in the logical volume in the order of the sequential numbers, but stops data storage processing on finding write data with the marker attribute (i.e. a marker) and then reports completion of reflection to the management software B 890 (step 1802). In the aforementioned processing, the write data reflection section B 240 checks the marker numbers of the markers that are recorded in the write data management information 330 and thereby ascertains whether the marker number is correct (whether the marker conforms to rules which are the same as the marker number decision rules, described above, for example of being a number whose initial value is 0 and that is incremented by 1 with respect to the previous marker number). If the marker number is not correct, the write data reflection section B 240 reports an abnormal situation to the management software B 890; if the marker number is correct, the write data reflection section B 240 records the marker number in the marker number information 360 and reports a normal situation. The management software B 890 may confirm the current marker number by reading the marker number that is recorded in the marker number information 360.

After confirming that a "normal reflection completed" report has been obtained from all of the storage devices B 190 that had been designated, the management software B 890 proceeds to the next processing (step 1803, step 1804).

Next, the management software B 890 gives instructions (step 1805) for updating of the snapshot of the logical volume 500 that stores the copy to all of the storage devices B 190. After receiving this instruction, the snapshot acquisition section B 260 updates (step 1806) the snapshot of the content of the logical volume 500. As the method of acquiring such a snapshot, for example the technique disclosed in U.S. Pat. No. 6,658,434 may be employed. It should be noted that, in this embodiment, just as in the case of the method described in embodiment 1, reflection of the write data to the volume that stores the snapshot data is stopped at the time of acquisition of the snapshot, and the content of the volume that stores the snapshot is frozen. After updating the snapshot, the snapshot acquisition section B 260 reports completion of snapshot updating to the management software B 890 (step 1807). After confirming that a report of completion of snapshot updating has been obtained from all of the storage devices B 190 that were designated, the management software B 890 proceeds to the next processing (step 1808, step 1809).

The management software A 800 and the management software B 890 respectively repeat the processing of the aforesaid step 1600 to step 1613 and of step 1800 to step 1809. In this way, the updating of the storage device A 100 to the logical volume 500 is constantly reflected to the logical volume 500 of the storage device B 190.

By processing as described above, the data updating by the MFA 600 and the open system host A 700 is stopped and a marker is created with the timing (checkpoint) at which the updating condition is unified between the plurality of storage devices; reflection (i.e. storage) of the updated data to the stored copy data in the plurality of target logical volumes provided in the plurality of target storage devices B 190 can be synchronized at the time immediately preceding the writing of the marker, so mutual consistency between the various copies can be obtained with the data of the mainframe host and the data of the open system host at the time of this marker. In addition, the MFB 690 or open system host B 790 can continue business using the matched data stored in the snapshot volume, since a copy having mutual consistency is held in the snapshot volume, this snapshot being acquired by reflection of the updated data to the copy data at a time that is synchronized between the plurality of copy data.

Figure 20:
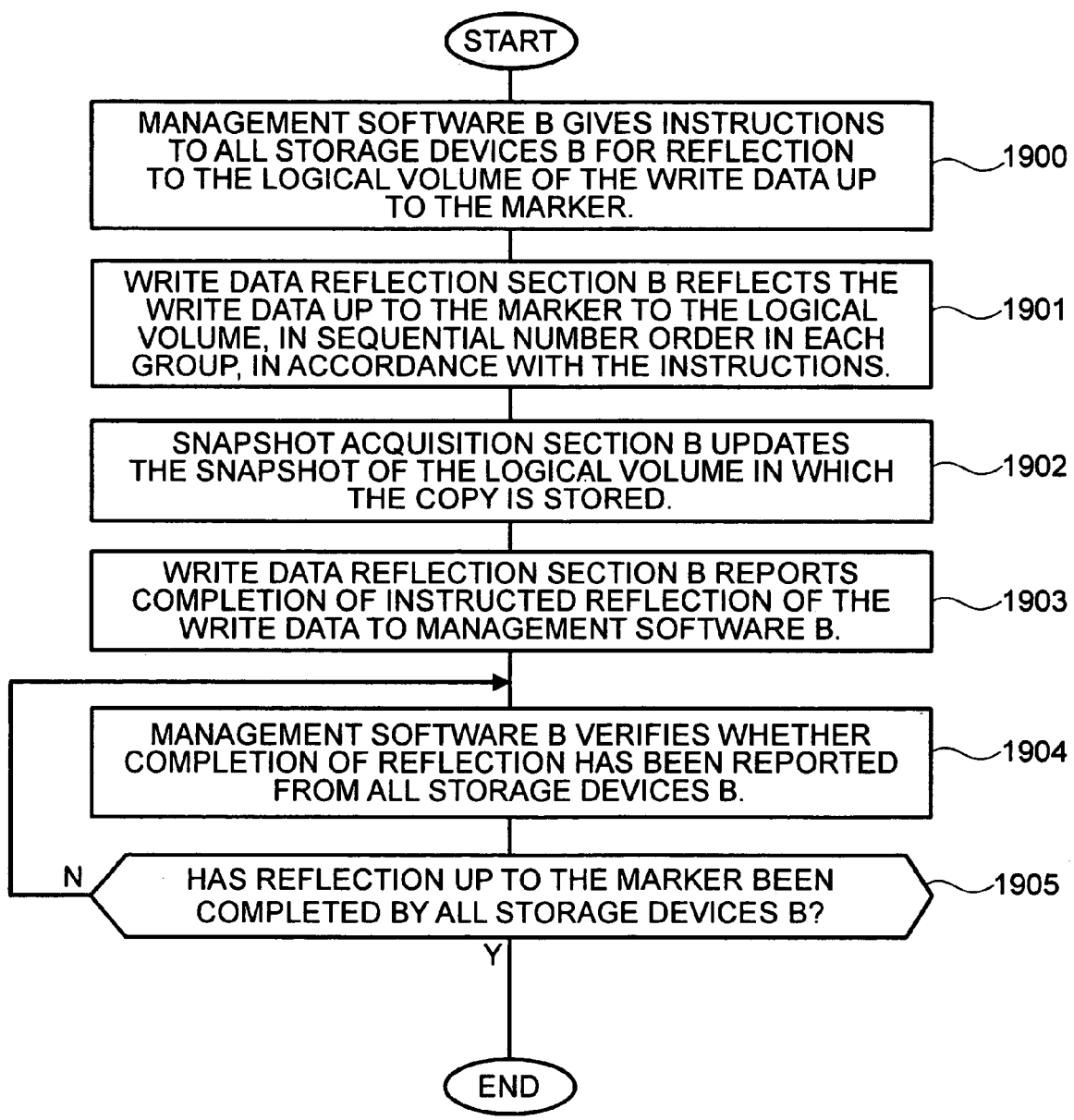
FIG. 20 is a flow diagram showing another example of reflection processing of write data in the storage device B in embodiment 3.

In the above processing, the snapshot was assumed to be updated by the storage device B 190 in response to an instruction from the management software B 890, but it would be possible to update the snapshot with the timing of synchronization of reflection of the updated data between the copy data of a plurality of storage devices B 190. FIG. 20 shows an example of the reflection processing of write data to the copy in the storage devices B 190 in this case.

The management software B 890 gives instructions,(step 1900) for reflection of the write data as far as the marker to the logical volume of 500 that stores the copy in all of the storage devices B 190. After receiving such an instruction, the write data reflection section B 240 reflects the write data in the same way as in the processing described with reference to FIG. 19 but stops the reflection as soon as it finds a marker and notifies the snapshot acquisition section B 260 (step 1901). After receiving such notification, the snapshot acquisition section B 260 updates the snapshot of the content of the logical volume 500 and notifies the write data reflection section B 240 (step 1902). After receiving this notification, the write data reflection section B 240 reports completion of reflection to the management software B 890 (step 1903). The management software B 890 confirms that a report of completion of snapshot updating has been obtained from all of the storage devices B 190 that were designated and then proceeds to the next processing (step 1904, step 1905).

Also, in the aforesaid processing, it was assumed that the storage device A 100 or storage device B 190 reported completion of processing in respect of the various types of instructions from the management software A 800 or management software B 890. However, it would also be possible for completion of the various types of processes by the storage device A 100 or storage device B 190 to be detected by the management software A 800 or management software B 890 by the management software A 800 or management software B 890 periodically making inquiries of the storage device A 100 or storage device B 190 regarding their processing condition in respect of the aforesaid instructions.

Also, in the above processing, transfer processing of write data from the storage device A 100 to the storage device B 190 is performed continuously, but it would be possible for the storage device A 100 to create a marker and to then stop transfer of write data and, in addition, for the storage device B 190, after detecting reflection processing of the received marker (after reflection of the write data previous to the marker) to stop reflection of the write data i.e. to put the processing by the storage device A 100 and storage device B 190 in a stopped condition (also called a suspended condition). However, the storage device B 190 could perform write data reflection up to the detection of the marker without reference to instructions from the management software B 890. In this case, the marker creation instruction is equivalent to an instruction to shift to the, suspended condition and mutually matched copies are created in the logical volume 500 of the storage device B 190 at the, time where all of the storage devices B 190 have shifted to the suspended condition. When restarting the copy processing, the copy processing is recommenced by the storage device A 100 and storage device B 190 in response to an instruction for recommencement of copy processing from the management software A 800 or management software B 890 after acquisition of the snapshot of the logical volume 500. As a result, copies having mutual consistency can be held in data stored by the snapshots, so MFB 690 or open system host B 790 can continue business using the matched data.

Also, in the processing described above, the various types of instructions, reports and exchange of information between the management software A 800 or management software B 890 and storage device A 100 and storage device B 190 may be executed by way of an I/O path 900 or could be executed by way of a network 920. In the case where instructions for marker creation are given in the form of a write request to the storage device A 100, a logical volume 500 that is not subject to the processing deferment of write instructions is provided at the storage device A 100 and the marker creation instructions are given in respect of this logical volume 500.

In the above processing, the storage device A 100 and storage device B 190 need not be connected in one-to-one relationship and it is not necessary that there should be the same number of devices, so long as the respective logical volumes 500 and logical volume groups correspond as source and copy.

Also, in the above construction, it was assumed that the management software A 800 was present in the MFA 600 and the management software B 890 was present in the MFB 690; however, it would be possible for the management software A 800 and management software B 890 to be present in any of the MFA 600, MFB 690, open system host A 700, open system host B 790, storage device A 100 or storage device B 190. Also, they could be present in another computer, not shown, connected with the storage device A 100 or storage device B 190.

In the above processing, it was assumed that the write data reflection section B 240 determined the correct marker number, but it would also be possible for the correct marker number to be designated to the storage device B 190 as a parameter of the reflection instructions by the management software B. Also, it could be arranged that when the management software A 800 gives instructions for deferment of processing of write requests and marker creation to the storage device A 100, a unique marker number is determined and designated to the storage device A 100 and communicated to the management software A 890 and that this management software B 890 then designates this marker number to the storage device B 190.

In the above processing, the occasion at which the management software A 800 instructions for deferment of processing of write requests and marker creation to the storage device A 100 may be determined in a manner linked with the processing of the APP 620 or APP 720. For example, synchronization of reflection to the copy may be performed at the checkpoint by giving instructions for deferment of write request processing and marker creation on the occasion of creation of a DBMS checkpoint. Business can therefore be continued by the MFB 690 or open system host B 790 using the data of this condition, by obtaining a snapshot in the condition in which the stored content of the source logical volume 500 at the checkpoint has been reflected to the copy in the target logical volume.

It could also be arranged for the MFA 600 or open system host A 700 to defer issue of a write request to the storage device A 100 or to restart, by linking the OS 610 or OS 710 with the management software A 800, instead of the management software A 800 giving instructions for deferment of processing of write requests and canceling of deferment in respect of the storage device A 100.

Also, as described in embodiment 1, a logical volume for write data storage that is separate from the cache 400 could be prepared and the write data stored in this logical volume 500 for write data storage. Also, in the transfer processing of write data, it would be possible for a write data transfer request to be initially issued in respect of the write data transfer section 220 by the write data reception section B 211 and for the write data to be transferred in respect of the write data reception section B 211 by the write data transfer section A 220 after receiving this request.

The processing described in this embodiment could also be implemented even if the write request does not contain a write time.

Embodiment 4

Figure 21:
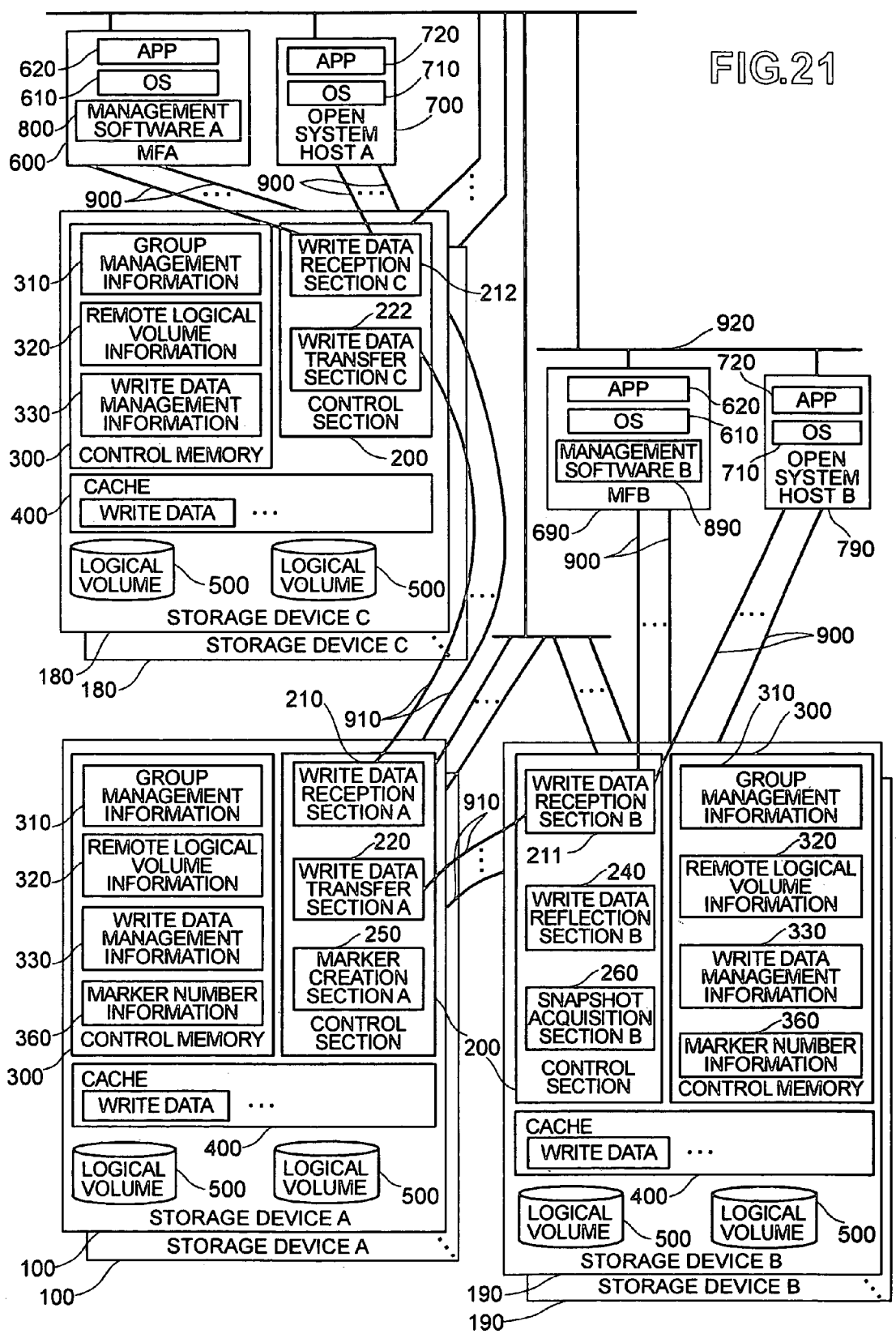
FIG. 21 is a view showing an example of the layout of a computer system according to embodiment 4.

FIG. 21 is a view showing an example of the layout of a computer system in embodiment 4.

The difference with respect to Embodiment 3 lies in that the MFA 600 and the open system host A 700 are respectively connected with a plurality of storage devices C 180 by way of an I/O path 900 and the plurality of storage devices C 180 are connected with a plurality of storage devices A 100 by way of a transfer path 910. In addition, the plurality of storage devices C 180 are connected with another computer or device by means of a network 920. The storage device A 100 and the storage device B 190 of embodiment 4 have the same construction and function as the storage device A 100 and storage device B 190 in embodiment 3.

In this embodiment, just as in the case of embodiment 2, a copy of the data stored in the logical volume 500 of the storage device C 180 is stored in the logical volume 500 of the storage device A 100. Specifically, the storage device C 180 comprises the same construction and various types of information as in embodiment 2 and after receiving a write request to the logical volume 500 from the MFA 600 or open system host A 700, the storage device C 180 stores the write data that it has received and transfers this received write data to the write data reception section A 210 of the storage device A 100; however, it is then guaranteed that a copy of the write data 640 or write data 740 that was written by the storage device C 180 exists in the storage device A 100, by sending a write completion notification to the MFA 600 or open system host A 700 after waiting for a notification of completion of reception from the write data reception section A 210, in the same way as in embodiment 2.

In addition, a copy of the data stored in the logical volume 500 of the storage device C 180 is stored in a logical volume 500 of the storage device B 190 by the same processing as the processing described in embodiment 3. By processing as described above, as described in embodiment 2, even if for example some fault occurs in the storage device C 180 or in the transfer path 910, causing transfer of data to the storage device A 100 to become impossible, the expected content that was recognized as having been stored in the storage device C 180 when processing of the MFA 600 or open system host A 700 was interrupted can still be obtained from the storage device B 190, so the MFB 690 or open system host B 790 can continue business using this data.

In the above processing, the management software A 800 gives instructions for deferment of processing of write requests or marker creation or cancellation of deferment of processing of write requests in respect of all of the storage devices C 180 in the same way as in the case of the processing performed in respect of the storage device A 100 in embodiment 3. Just as in the case of step 1600 of embodiment 3, the management software A 800 first of all gives instructions for deferment of processing of write requests to all of the storage devices C 180. After receiving these instructions, the write data reception section C 212 of the storage device C 180 defers processing of write requests in the same way as in the case of the processing performed by the storage device A 100 in step 1601 and step 1602 of embodiment 3 and reports commencement of deferment to the management software A 800. As described above, at this time, write data in respect of which a write completion notification has been given in respect of the MFA 600 or open system host A 700 has already been transferred to the storage device A 100 and the storage device A 100 creates write data management information 300 of this write data. In the same way as in the case of step 1603 and step 1604 of embodiment 3, the management software A 800 confirms that a report of commencement of deferment has been obtained from all of the designated storage devices C 180 before proceeding to the following processing.

Next, the management software A 800 gives instructions for marker creation to all of the storage devices C 180 in the same way as in the step 1605 of embodiment 3. After receiving such an instruction, the storage device C 180 transmits a marker creation instruction through the path 910 or network 920 to the storage device A 100 that stores the copy. After receiving the marker creation instruction, the storage device A 100 creates a marker in the same way as in step 1606, step 1607 and step 1608 of embodiment 3 and reports completion of marker creation to the storage device C 180 through the transfer path 910 or network 920. After receiving the report, the storage device C 180 reports completion of marker creation to the management software A 800. The management software A 800 confirms that a report of completion of marker creation has been received from all of the designated storage devices C 180 in the same way as in step 1609 and step 1610 of embodiment 3 before proceeding to the next processing.

Next, the management software A 800, in the same way as in step 1611 of embodiment 3, gives instructions for cancellation of deferment of processing of write requests to all of the storage devices C 180. After receiving these instructions, the write data reception section C 212 of the storage device C 180 cancels the write request processing deferment in the same way as the processing that was performed by the storage device A 100 in step 1612 and step 1613 of embodiment 3 and reports this cancellation of deferment to the management software A 800.

Specifically, deferment of processing of write requests and cancellation of deferment are performed by the storage device C 180 and marker creation meanwhile is performed by the storage device A 100 on transmission to the storage device A 100 of an instruction by the storage device C 180. As described above, write data in respect of which completion of writing has been notified to the MFA 600 or open system host A 700 has already been transferred to the storage device A 100 and write data management information 300 of such write data is created in the storage device A 100, so deferment of processing of write requests by the storage device A 100 in embodiment 3 and deferment of processing of write requests by the storage device C 180 in this embodiment are equivalent. Consequently, by performing processing as described above and by performing other processing as described in embodiment 3, in the construction of this embodiment, reflection of updating to the copies can be synchronized at the marker time by stopping data updating by the MFA 600 and open system host A 700 in the same way as in embodiment 3 and creating a marker of the updated condition with unified timing (checkpoint) between the plurality of storage devices; mutual consistency of the respective copies with the mainframe host data and the open system host data can thus be achieved at this time. Furthermore, mutually matched copies are maintained in snapshot volumes by acquiring snapshots at the time of synchronization of reflection and the MFB 690 or open system host B 790 can therefore continue business using matched data.

In the above processing, it was assumed that the management software A 800 gave instructions for marker creation to the storage devices C 180 and the storage devices C 180 transmitted these instructions to the storage devices A 100; however, it would also be possible for the management software A 800 to give instructions for marker creation directly to all of the storage devices A 100 and for the storage devices A 100 to report completion of marker creation to the management software 800. Specifically, the management software A 800 first of all gives instructions for deferment of write request processing to all of the storage devices C 180 and the management software A 800 confirms that reports of commencement of deferment have been received from all of the designated storage devices C 180 before giving instructions for marker creation to all of the storage devices A 180 in the same way as in step 1605 of embodiment 3. After having received these instructions, the storage device A 100 creates a marker in the same way as in step 1606, step 1607 and step 1608 of embodiment 3 and reports completion of marker creation to the management software 800. After confirming that reports of completion of marker creation have been obtained from all of the designated storage devices A 100 in the same way as in step 1609 and step 1610 of embodiment 3, the management software A 800 may be arranged to give instructions for the cancellation of deferment of write request processing to all of the storage devices C 180.

Also, it would be possible that the storage devices C 180 are provided with a marker creation section and marker number information 330 and create a marker on receipt of instructions for marker creation from the management software A 800; the marker, which has been created as write data, is then transferred to the storage device A 100 and completion of marker creation may be arranged to be reported to the management software A 800 when a report of receipt thereof has been received from the write data reception section 210 of the storage device A 100. In this case, the storage device A 100 treats the received marker as a special type of write data, which is transferred to the storage device B 190 after processing in the same way as ordinary write data except that reflection to the copy is not performed.

In any case, the above can be implemented irrespective of the number of storage devices C 180 that are connected with the storage devices A 100 and deposit copies on the storage devices A 100.

Also, although not shown, if a mainframe host and open system host are connected with the storage devices A 100 by an I/O path, if for example some fault occurs in the MFA 600 or open system host A 700 or storage devices C 180, the aforesaid mainframe host and open system host can continue business using the content of the logical volume 500 of the storage device A 100 that is matched therewith.

What is claimed is:

1. A remote copy system comprising:
   a management software stored on a computer readable storage medium and implemented in one or more computers;
   a plurality of first storage systems, each comprising a first control section to be coupled to the computers, at least one first logical volume for storing data received from the computers, and a first storage area for storing data to be transmitted to a second storage system; and
   a plurality of second storage systems, each coupled to a first storage system and comprising a second control section, at least one second logical volume for storing a replica of data stored in the first logical volume of at least one of the plurality of first storage systems, and a second storage area for storing data received from the at least one of the plurality of first storage systems,
   wherein first control sections of the plurality of first storage systems receive a plurality of first write requests from the computers and store a plurality of first write data, which relate to the plurality of first write requests and are stored in first logical volumes of the plurality of first storage systems, in first storage areas of the plurality of first storage systems,
   wherein the first control sections of the plurality of first storage systems defer operations for executing a plurality of second write requests received from the computers, and store a plurality of identification information, each corresponding to a marker and received from the management software, and transmit completion reports to the management software after storing the plurality of identification information,
   wherein the management software sends instructions, for restarting the operations for executing the plurality of second write requests, to the plurality of first storage systems after the management software receives the completion reports,
   wherein the first control sections of the plurality of first storage systems transfer the plurality of first write data and the plurality of identification information to the plurality of second storage systems,
   wherein second control sections of the plurality of second storage systems receive the plurality of first write data and the plurality of identification information from the plurality of first storage systems, and
   wherein the second control sections of the plurality of second storage systems control operations according to a plurality of instructions sent from at least one of the management software and another management software, stored on other computer readable storage medium and implemented in one or more other computers coupled to the plurality of second storage systems, such that the plurality of first write data received from the plurality of first storage systems are stored in second logical volumes of the plurality of second storage systems when the plurality of identification information are designated by the plurality of instructions sent from the at least one of the management software and the another management software.

2. A remote copy system according to claim 1, wherein first control sections of the plurality of first storage systems receive a plurality of new first write requests from the computers and store a plurality of new first write data, which relates to the plurality of new first write requests and are stored in first logical volumes of the plurality of first storage systems, in first storage areas of the plurality of first storage systems,
   wherein the first control sections of the plurality of first storage systems defer operations for executing a plurality of new second write requests received from the computers, and store a plurality of new identification information, each corresponding to a new marker and received from the management software, and transmit new completion reports to the management software after storing the plurality of new identification information,
   wherein the management software sends instructions, for restarting the operations for executing the plurality of new second write requests, to the plurality of first storage systems after the management software receives the new completion reports, wherein the first control sections of the plurality of first storage systems transfer the plurality of new first write data and the plurality of new identification information to the plurality of second storage systems, and wherein second control sections of the plurality of second storage systems receive the plurality of new first write data and the plurality of new identification information from the plurality of first storage systems.

3. A remote copy system according to claim 1, wherein first control sections of the plurality of first storage systems repeatedly receive a plurality of new first write requests from the computers and repeatedly store a plurality of new first write data, which relates to the plurality of new first write requests and are stored in first logical volumes of the plurality of first storage systems, in first storage areas of the plurality of first storage systems, wherein the first control sections of the plurality of first storage systems repeatedly defer operations for executing a plurality of new second write requests newly received from the computers, and repeatedly store a plurality of new identification information, each corresponding to a new marker and newly received from the management software, and repeatedly transmit new completion reports to the management software after storing the plurality of new identification information, wherein the management software repeatedly sends instructions, for restarting the operations for executing the plurality of new second write requests, to the plurality of first storage systems after the management software receives the new completion reports, wherein the first control sections of the plurality of first storage systems repeatedly transfer the plurality of new first write data and the plurality of new identification information to the plurality of second storage systems, and wherein second control sections of the plurality of second storage systems repeatedly receive the plurality of new first write data and the plurality of new identification information from the plurality of first storage systems.

4. A remote copy system according to claim 1, (A) wherein first control sections of the plurality of first storage systems receive a plurality of new first write requests from the computers and store a plurality of new first write data, which relates to the plurality of new first write requests and are stored in first logical volumes of the plurality of first storage systems, in first storage areas of the plurality of first storage systems;

(B) wherein the first control sections of the plurality of first storage systems defer operations for executing a plurality of new second write requests received from the computers, and store a plurality of new identification information, each corresponding to a new marker and received from the management software, and transmit new completion reports to the management software after storing the plurality of new identification information;

(C) wherein the management software sends instructions, for restarting the operations for executing the plurality of new second write requests, to the plurality of first storage systems after the management software receives the new completion reports;

(D) wherein the first control sections of the plurality of first storage systems transfer the plurality of new first write data and the plurality of new identification information to the plurality of second storage systems;

(E) wherein second control sections of the plurality of second storage systems receive the plurality of new first write data and the plurality of new identification information from the plurality of first storage systems; and wherein the wherein clauses (A) to (E) are serially performed repeatedly.

5. A remote copy system according to claim 1, wherein each of the plurality of identification information is a marker number.

6. A remote copy system according to claim 2, wherein a value of each of the plurality of identification information is different from a value of each of the plurality of new identification information.

7. A remote copy system according to claim 1, wherein the plurality of identification information include same information.

8. A remote copy system according to claim 6, wherein the plurality of identification information include same information.

9. A remote copy system according to claim 1, wherein the first control section of each of the plurality of first storage systems receives a plurality of third write requests from the computers and stores a plurality of third write data, which relates to the plurality of third write requests and are stored in the first logical volume of each of the plurality of first storage systems, in the first storage area of each of the plurality of first storage systems, wherein the first control section of each of the plurality of first storage systems defers operations for executing a plurality of fourth write requests received from the computers, and stores an identification information, corresponding to a marker and received from the management software, and transmits a completion report to the management software after storing the identification information, wherein the management software sends instructions, for restarting the operations for executing the plurality of fourth write requests, to each of the plurality of first storage systems after the management software receives the completion report from the first control section of each of the plurality of first storage systems, wherein the first control section of each of the plurality of first storage systems transfers the plurality of third write data and the identification information to at least one of the plurality of second storage systems, wherein the second control section of each of the plurality of second storage systems receives the plurality of third write data and the identification information from at least one of the plurality of first storage systems, and wherein the second control section of each of the plurality of second storage systems controls operation according to an instruction sent from the at least one of the management software and the another management software such that the plurality of third write data received from the at least one of the plurality of first storage systems are stored in the second logical volumes of the at least one of the plurality of second storage systems when the identification information is designated by the instruction sent from the at least one of the management software and the another management software.

10. A remote copy system according to claim 1, (A) wherein the first control section of each of the plurality of first storage systems receives a plurality of third write requests from the computers and stores a plurality of third write data, which relates to the plurality of third write requests and are stored in the first logical volume of each of the plurality of first storage systems, in the first storage area of each of the plurality of first storage systems;

(B) wherein the first control section of each of the plurality of first storage systems defers operations for executing a plurality of fourth write requests received from the computers, and stores an identification information, corresponding to a marker and received from the management software, and transmits a completion report to the management software after storing the identification information;

(C) wherein the management software sends instructions, for restarting the operations for executing the plurality of fourth write requests, to each of the plurality of first storage systems after the management software receives the completion report from the first control section of each of the plurality of first storage systems;

(D) wherein the first control section of each of the plurality of first storage systems transfers the plurality of third write data and the identification information to at least one of the plurality of second storage systems;

(E) wherein the second control section of each of the plurality of second storage systems receives the plurality of third write data and the identification information from at least one of the plurality of first storage systems; and wherein the wherein clauses (A) to (E) are serially performed repeatedly according to an asynchronous remote copy process.

11. A remote copy system according to claim 1, wherein the first control sections of the plurality of first storage systems store the plurality of identification information in memories of the plurality of first storage systems during deferring the operations for executing the plurality of second write requests.

12. A remote copy system according to claim 10, wherein the first control section of each of the plurality of first storage systems stores the identification information in a memory during deferring the operations for executing the plurality of fourth write requests.

13. A remote copy system according to claim 1, wherein the plurality of identification information are used for establishing consistency between a plurality of replica data stored in the second logical volumes of the plurality of second storage systems.

14. A remote copy system according to claim 1, wherein the second control sections of the plurality of second storage systems control to store the plurality of first write data, received from the plurality of first storage systems, in second storage areas of the plurality of second storage systems, and wherein the second control sections of the plurality of second storage systems control to store the plurality of first write data, stored in the second storage areas of the plurality of second storage systems, in the second logical volumes of the plurality of second storage systems when the plurality of identification information are designated by the plurality of instructions sent from the at least one of the management software and the another management software.

15. A remote copy system according to claim 1, wherein the plurality of first storage systems and the plurality of second storage systems configure a plurality of pairs, each including the first logical volumes of one of the plurality of first storage systems and the second logical volumes of one of the plurality of second storage systems.

16. A remote copy system according to claim 1, wherein the management software and/or the another management software reads the plurality of identification information from the plurality of second storage systems and determines to designate the plurality of identification information.

17. A remote copy system comprising:

a plurality of first storage systems, each comprising a first control section to be coupled to one or more computers, at least one first logical volume, and a first storage area for storing data to be transmitted to a second storage system; and a plurality of second storage systems, each coupled to a first storage system and comprising a second control section, at least one second logical volume for storing replicated data corresponding to data to be stored in the first logical volume of at least one of the plurality of first storage systems, and a second storage area for storing data received from the at least one of the plurality of first storage systems, wherein each of first control sections of the plurality of first storage systems receives a plurality of first write requests from the computers and stores a plurality of first write data, which correspond to a plurality of write data to be stored in the first logical volume according to the plurality of first write requests, in the first storage area, wherein each of the first control sections records an identification information received from a management software in the computers and transmits a completion report to the management software after recording the identification information, wherein each of the plurality of first storage systems receives an instruction, for cancellation of a deferment process, from the management software after each of the plurality of first storage systems sends the completion report to the management software, the deferment process being a process in which write processes of a plurality of second write requests received from the computers are deferred, wherein each of the first control sections transfers the plurality of first write data and the identification information to at least one of the plurality of second storage systems according to an asynchronous remote copy process, wherein each of second control sections of the plurality of second storage systems receives the plurality of first write data and the identification information from at least one of the plurality of first storage systems, and wherein each of the second control sections controls operation according to another instruction sent from at least one of the management software and another management software in one or more other computers coupled to the plurality of second storage systems such that the plurality of first write data received from at least one of the plurality of first storage systems are stored in the second logical volume of at least one of the plurality of second storage systems if information corresponding to the identification information is designated by the another instruction sent from the at least one of the management software and the another management software.

18. A remote copy system according to claim 17, wherein each of the first control sections receives a plurality of new first write requests from the computers and stores a plurality of new first write data, which correspond to a plurality of new write data to be stored in the first logical volume according to the plurality of new first write requests, in the first storage area, wherein each of the first control sections records a new identification information received from the management software and transmits new completion report to the management software after recording the new identification information, wherein each of the plurality of first storage systems receives new instruction, for cancellation of a new deferment process, from the management software after each of the plurality of first storage systems sends the new completion report to the management software, the new deferment process being a process in which write processes of a plurality of new second write requests received from the computers are deferred, wherein each of the first control sections transfers the plurality of new first write data and the new identification information to at least one of the plurality of second storage systems according to the asynchronous remote copy process, and wherein each of the second control sections receives the plurality of new first write data and the new identification information from at least one of the plurality of first storage systems.

19. A remote copy system according to claim 17, wherein each of the first control sections repeatedly receives a plurality of new first write requests from the computers and repeatedly stores a plurality of new first write data, which correspond to a plurality of new write data to be stored in the first logical volume according to the plurality of new first write requests, in the first storage area, wherein each of the first control sections repeatedly records a new identification information received from the management software and repeatedly transmits new completion report to the management software after recording the new identification information, wherein each of the plurality of first storage systems repeatedly receives new instruction, for cancellation of a new deferment process, from the management software after each of the plurality of first storage systems sends the new completion report to the management software, the new deferment process being a process in which write processes of a plurality of new second write requests received from the computers are deferred, wherein each of the first control sections repeatedly transfers the plurality of new first write data and the new identification information to at least one of the plurality of second storage systems according to the asynchronous remote copy process, and wherein each of the second control sections repeatedly receives the plurality of new first write data and the new identification information from at least one of the plurality of first storage systems.

20. A remote copy system according to claim 17, (A) wherein each of the first control sections receives a plurality of new first write requests from the computers and stores a plurality of new first write data, which correspond to a plurality of new write data to be stored in the first logical volume according to the plurality of new first write requests, in the first storage area;

(B) wherein each of the first control sections records a new identification information received from the management software and transmits new completion report to the management software after recording the new identification information;

(C) wherein each of the plurality of first storage systems receives new instruction, for cancellation of a new deferment process, from the management software after each of the plurality of first storage systems sends the new completion report to the management software, the new deferment process being a process in which write processes a plurality of new second write requests received from the computers are deferred;

(D) wherein each of the first control sections transfers the plurality of new first write data and the new identification information to at least one of the plurality of second storage systems according to the asynchronous remote copy process;

(E) wherein each of the second control sections receives the plurality of new first write data and the new identification information from at least one of the plurality of first storage systems; and wherein the wherein clauses (A) to (E) are serially performed repeatedly.

21. A remote copy system according to claim 17, wherein the identification information is a marker number.

22. A remote copy system according to claim 18, wherein a value of the identification information is different from a value of the new identification information.

23. A remote copy system according to claim 17, wherein the identification information recorded by each of the first control sections includes same information.

24. A remote copy system according to claim 22, wherein the identification information recorded by each of the first control sections includes same information.

25. A remote copy system according to claim 17, wherein each of the first control sections stores the identification information in a memory of each of the plurality of first storage systems during the deferment process.

26. A remote copy system according to claim 24, wherein each of the first control sections stores the identification information in a memory of each of the plurality of first storage systems during the deferment process.

27. A remote copy system according to claim 17, wherein the identification information is used for establishing consistency between a plurality of replica data stored in the second logical volumes of the plurality of second storage systems.

28. A remote copy system according to claim 17, wherein each of the second control sections controls to store the plurality of first write data, received from the at least one of the plurality of first storage systems, in the second storage area, and wherein each of the second control sections controls to store the plurality of first write data, stored in the second storage area, in the second logical volume if information corresponding to the identification information is designated by the another instruction sent from the at least one of the management software and the another management software.

29. A remote copy system according to claim 17, wherein the plurality of first storage systems and the plurality of second storage systems configure a plurality of pairs, each including the first logical volume of one of the plurality of first storage systems and the second logical volume of one of the plurality of second storage systems.

30. A remote copy system according to claim 17, wherein the at least one of the management software and the another management software reads the identification information from each of the plurality of second storage systems and determines to designate the identification information.

31. A remote copy system according to claim 17, wherein the identification information relates to a marker.

32. A remote copy system comprising:

a plurality of first storage systems, each comprising a first control section to be coupled to one or more computers, at least one first logical volume, and a first storage area for storing data to be transmitted to a second storage system; and a plurality of second storage systems, each coupled to a first storage system and comprising a second control section, at least one second logical volume, and a second storage area for storing replicated data, corresponding to data to be stored in at least one of first logical volumes of the plurality of first storage systems, and received from at least one of the plurality of first storage systems, wherein first control sections of the plurality of first storage systems receive a plurality of first write requests from the computers and stores a plurality of first write data, which correspond to a plurality of write data to be stored in first logical volumes of the first storage systems according to the plurality of first write requests, in first storage areas of the plurality of first storage systems, wherein the first control sections record a plurality of identification information received from a management software in the computers and transmit a plurality of acknowledges to the management software after recording the plurality of identification information, wherein the plurality of first storage systems receive a plurality of instructions, for cancellation of a status in which a plurality of second write requests subsequent to the plurality of first write requests are not processed, from the management software after the plurality of first storage systems send the plurality of acknowledges to the management software, wherein the first control sections transfer the plurality of first write data and the plurality of identification information to the plurality of second storage systems, wherein second control sections of the plurality of second storage systems receive the plurality of first write data and the plurality of identification information from the plurality of first storage systems, wherein the second control sections control operation according to a plurality of another instructions sent from at least one of the management software and another management software in one or more other computers coupled to the plurality of second storage systems such that the plurality of first write data received from the plurality of first storage systems are stored in second logical volumes of the plurality of second storage systems if the plurality of identification information are designated by the plurality of another instructions sent from the at least one of the management software and the another management software.

33. A remote copy system according to claim 32
(A) wherein the first control section of one of the plurality of first storage systems receives a plurality of third write requests, which include at least one of the first write requests and are sent from the computers, and stores a plurality of third write data, which correspond to a plurality of write data to be stored in the first logical volumes according to the plurality of third write requests, in the first storage areas;
(B) wherein the first control section of the one of the plurality of first storage systems records one of the plurality of identification information received from the management software and transmits one of the plurality of acknowledges to the management software after recording the one of the plurality of identification information;
(C) wherein the one of the plurality of first storage systems receives one of the plurality of instructions from the management software after the plurality of first storage systems send the plurality of acknowledges to the management software;
(D) wherein the first control section of the one of the plurality of first storage systems transfers the plurality of third write data and the one of the plurality of identification information to at least one of the plurality of second storage systems;
(E) wherein the second control section of one of the plurality of second storage systems receives the plurality of third write data and the one of the plurality of identification information from at least one of the plurality of first storage systems; and
wherein the wherein clauses (A) to (E) are serially performed repeatedly.

34. A remote copy system according to claim 33, wherein the first control section of one of the plurality of first storage systems receives a plurality of new third write requests sent from the computers and stores a plurality of new third write data, which correspond to a plurality of new write data to be stored in the first logical volumes according to the plurality of new third write requests, in the first storage areas, wherein the first control section of the one of the plurality of first storage systems records one of a plurality of new identification information received from the management software and transmits one of the plurality of new acknowledges to the management software after recording the one of the plurality of new identification information, wherein the one of the plurality of first storage systems receives one of a plurality of new instructions, for cancellation of a status in which a plurality of new second write requests subsequent to the plurality of new third write requests are not processed, from the management software after the plurality of first storage systems send the plurality of new acknowledges to the management software, wherein the first control section of the one of the plurality of first storage systems transfers the plurality of new third write data and the one of the plurality of new identification information to at least one of the plurality of second storage systems, and wherein the second control section of one of the plurality of second storage systems receives the plurality of new third write data and the one of the plurality of new identification information from at least one of the plurality of first storage systems.

35. A remote copy system according to claim 32:
(A) wherein the first control sections receive a plurality of new first write requests from the computers and store a plurality of new first write data, which correspond to a plurality of new write data to be stored in the first logical volume according to the plurality of new first write requests, in the first storage areas;
(B) wherein the first control sections record a plurality of new identification information received from the management software and transmit a plurality of new acknowledges to the management software after recording the plurality of new identification information;
(C) wherein the plurality of first storage systems receive a plurality of new instruction, for cancellation of a status in which a plurality of new second write requests subsequent to the plurality of new first write requests are not processed, from the management software after the plurality of first storage systems send the plurality of new acknowledges to the management software;

(D) wherein the first control sections transfer the plurality of new first write data and the plurality of new identification information to the plurality of second storage systems;

(E) wherein the second control sections receive the plurality of new first write data and the plurality of new identification information from the plurality of first storage systems; and wherein the wherein clauses (A) to (E) are serially performed repeatedly.

36. A remote copy system according to claim 32, wherein the plurality of identification information are a plurality of tag numbers.

37. A remote copy system according to claim 35, wherein a value of one of the plurality of identification information is different from a value of one of the plurality of new identification information.

38. A remote copy system according to claim 32, wherein each of the plurality of identification information recorded by the first control sections include same information.

39. A remote copy system according to claim 37, wherein each of the plurality of identification information recorded by the first control sections include same information.

40. A remote copy system according to claim 32, wherein the first control sections store the plurality of identification information in a plurality of memories of the plurality of first storage systems during the status in which the plurality of second write requests are not processed.

41. A remote copy system according to claim 39, wherein the first control sections store the plurality of identification information in a plurality of memories of the plurality of first storage systems during the status in which the plurality of second write requests are not processed.

42. A remote copy system according to claim 32, wherein the plurality of identification information are used for establishing consistency between
a plurality of replicated data stored in the second logical volumes of the plurality of second storage systems.

43. A remote copy system according to claim 32, wherein the second control sections control to store the plurality of first write data, received from the at least one of the plurality of first storage systems, in second storage areas of the plurality of second storage systems, and
wherein the second control sections control to store the plurality of first write data, stored in the second storage areas, in the second logical volumes if the plurality of identification information are designated by the plurality of another instructions sent from the at least one of the management software and the another management software.

44. A remote copy system according to claim 32, wherein the plurality of first storage systems and the plurality of second storage systems configure a plurality of pairs, each including the first logical volume of one of the plurality of first storage systems and the second logical volume of one of the plurality of second storage systems.

45. A remote copy system according to claim 32, wherein the at least one of the management software and the another management software reads the plurality of identification information from the plurality of second storage systems and determines to designate the plurality of identification information.

46. A remote copy system according to claim 32, wherein each of the plurality of identification information relates to a tag.

47. A remote copy system according to claim 32, wherein the status, in which the plurality of second write requests are not processed, is a status in which write processes of the plurality of second write requests are prevented.

48. A remote copy system according to claim 32, wherein the status, in which the plurality of second write requests are not processed, is a status in which write processes of the plurality of second write requests are not processed; and
wherein the first control sections start the status and transmit the plurality of acknowledges to the management software after starting the status.

49. A remote copy system according to claim 32, wherein the status, in which the plurality of second write requests are not processed, is a status in which write processes of the plurality of second write requests are deferred.

50. At least one storage system adaptive to be included in a plurality of first storage systems, each of the plurality of first storage systems comprising:
a first control section to be coupled to one or more computers,
one or more disk drives related to at least one first logical volume, and
a first storage area for storing data to be transmitted to a second storage system included in a plurality of second storage systems, each of the second storage systems comprising a second control section, one or more second disk drives related to at least one second logical volume, and a second storage area for storing data received from at least one of the plurality of first storage systems,
wherein first control sections of the plurality of first storage systems receive a plurality of first write requests from the computers and store a plurality of first write data, which correspond to a plurality of write data to be stored in first logical volumes of the plurality of first storage systems according to the plurality of first write requests, in first storage areas of the first storage systems,
wherein the first control sections of the plurality of first storage systems record a plurality of identification information received from a management software in the one or more computers and transmit a plurality of reports to the management software after recording the plurality of identification information,
wherein the first control sections of the plurality of first storage systems receive a plurality of instructions, for cancellation of a status in which a plurality of write processes of a plurality of second write requests subsequent to the plurality of first write requests are not processed, from the management software after the first control sections of the plurality of first storage systems send the plurality of reports to the management software, and
wherein the first control sections of the plurality of first storage systems transfer the plurality of first write data and the plurality of identification information to the plurality of second storage systems, so that second control sections of the plurality of second storage systems receive the plurality of first write data and the plurality of identification information and control operation according to a plurality of another instructions sent from at least one of the management software and another management software in one or more other computers coupled to the plurality of second storage systems such that the plurality of first write data are stored in second logical volumes of the plurality of second storage systems if the plurality of identification information are designated by the plurality of another instructions.

51. At least one storage system according to claim 50:
(A) wherein the first control section of one of the plurality of first storage systems receives a plurality of third write requests, which include at least one of the plurality of first write requests and are sent from the computers, and stores a plurality of third write data, which correspond to a plurality of write data to be stored in the first logical volume of one of the plurality of first storage systems according to the plurality of third write requests, in the first storage area of one of the first storage systems;
(B) wherein the first control section of one of the plurality of first storage systems records one of the plurality of identification information received from the management software and transmits one of the plurality of reports to the management software after recording the one of the plurality of identification information;
(C) wherein the first control section of one of the plurality of first storage systems receives one of the plurality of instructions from the management software after first control sections of the plurality of first storage systems send the plurality of reports to the management software; and
(D) wherein the first control section of one of the plurality of first storage systems transfers the plurality of third write data and the one of the plurality of identification information to at least one of the plurality of second storage systems according to an asynchronous remote copy process; and
wherein the wherein clauses (A) to (D) are serially performed repeatedly.

52. At least one storage system according to claim 51, wherein the first control section of one of the plurality of first storage systems receives a plurality of new third write requests from the computers and stores a plurality of new third write data, which correspond to a plurality of write data to be stored in the first logical volume of one of the plurality of first storage systems according to the plurality of third new write requests, in the first storage area of one of the first storage systems,
wherein the first control section of one of the plurality of first storage systems records one of a plurality of new identification information received from the management software and transmits one of the plurality of new reports to the management software after recording the one of the plurality of new identification information,
wherein the first control section of one of the plurality of first storage systems receives one of a plurality of new instructions from the management software after first control sections of the plurality of first storage systems send the plurality of new reports to the management software, and
wherein the first control section of one of the plurality of first storage systems transfers the plurality of new third write data and the one of the plurality of new identification information to at least one of the plurality of second storage systems according to an asynchronous remote copy process.

53. At least one storage system according to claim 50:
(A) wherein the first control sections of the plurality of first storage systems receive a plurality of new first write requests from the one or more computers and store a plurality of new first write data, which correspond to a plurality of new write data to be stored in the first logical volumes of the plurality of first storage systems according to the plurality of new first write requests, in the first storage areas of the first storage systems;
(B) wherein the first control sections of the plurality of first storage systems record a plurality of new identification information received from the management software and transmit a plurality of new reports to the management software after recording the plurality of new identification information;
(C) wherein the first control sections of the plurality of first storage systems receive a plurality of new instructions, for cancellation of a status in which a plurality of write processes of a plurality of new second write requests subsequent to the plurality of new first write requests are not processed, from the management software after the first control sections of the plurality of first storage systems send the plurality of new reports to the management software;
(D) wherein the first control sections of the plurality of first storage systems transfer the plurality of new first write data and the plurality of new identification information to the plurality of second storage systems; and
wherein the wherein clauses (A) to (D) are serially performed repeatedly.

54. At least one storage system according to claim 50, wherein each of the plurality of identification information is a marker number.

55. At least one storage system according to claim 53, wherein a value of one of the plurality of identification information is different from a value of one of the plurality of new identification information.

56. At least one storage system according to claim 50, wherein each of the plurality of identification information recorded by the first control sections of the plurality of first storage systems includes same information.

57. At least one storage system according to claim 55, wherein each of the plurality of identification information recorded by the first control sections of the plurality of first storage systems includes same information.

58. At least one storage system according to claim 50, wherein the first control sections of the plurality of first storage systems store the plurality of identification information in a plurality of memories of the plurality of first storage systems during the status in which the plurality of write processes of the plurality of second write requests are not processed.

59. At least one storage system according to claim 57, wherein the first control sections of the plurality of first storage systems store the plurality of identification information in a plurality of memories of the plurality of first storage systems during the status in which the plurality of write processes of the plurality of second write requests are not processed.

60. At least one storage system according to claim 50, wherein the plurality of identification information is used for establishing consistency between a plurality of replicated data stored in the second logical volumes of the plurality of second storage systems.

61. At least one storage system according to claim 51, wherein the second control sections of the plurality of second storage systems control to store the plurality of first write data, received from the plurality of first storage systems, in second storage areas of the second storage systems, and wherein the second control sections of the plurality of second storage systems control to store the plurality of first write data, stored in the second storage areas, in the second logical volumes of the second storage if the plurality of identification information are designated by the plurality of another instructions.

62. At least one storage system according to claim 50, wherein the plurality of first storage systems and the plurality of second storage systems configure a plurality of pairs, each including the first logical volume of one of the plurality of first storage systems and the second logical volume of one of the plurality of second storage systems.

63. At least one storage system according to claim 50, wherein the at least one of the management software and the another management software reads the plurality of identification information from the plurality of second storage systems and determines to designate the plurality of identification information.

64. At least one storage system according to claim 50, wherein the plurality of identification information relate to a plurality of markers.

65. At least one storage system according to claim 50, wherein the status, in which the plurality of write processes of the plurality of second write requests are not processed, is a status in which the plurality of write processes of the plurality of second write requests are prevented.

66. At least one storage system according to claim 50, wherein the status, in which the plurality of write processes of the plurality of second write requests are not processed, is a status in which the plurality of write processes of the plurality of second write requests are not processed; and
wherein the first control sections of the plurality of first storage systems start the status and transmit the plurality of reports to the management software after starting the status.

67. At least one storage system according to claim 50, wherein the status, in which the plurality of write processes of the plurality of second write requests are not processed, is a status in which the plurality of write processes of the plurality of second write requests are deferred.

68. A computer program stored on a computer readable storage medium and implemented in at least one first computer, the first computer adaptive to be coupled to a plurality of first storage systems each comprising a first control section and one or more disk drives related to at least one first logical volume, the plurality of first storage systems coupled to a plurality of second storage systems, the plurality of second storage systems each comprising a second control section and one or more second disk drives related to at least one second logical volume storing replicated data of data stored in the first logical volume of at least one of the plurality of first storage systems, the computer program comprising:
code controlling to send a plurality of identification information to the plurality of first storage systems;
code controlling to receive a plurality of reports from the plurality of first storage systems after sending the plurality of identification information; and
code controlling to send a plurality of instructions to the plurality of first storage systems after receiving the plurality of reports from the plurality of first storage systems, the plurality of instructions instructing to cancel a plurality of deferment processes in which write processes of a plurality of first write requests are deferred,
wherein the plurality of identification information are related to a plurality of write data by the plurality of first storage systems, the plurality of write data correspond to a plurality of second write requests received from at least one of the first computer and one or more second computers coupled to the plurality of first storage systems before receiving the plurality of first write request and are stored in first logical volumes of the plurality of first storage systems,
wherein the plurality of identification information and the plurality of write data are transferred from the plurality of first storage systems to the plurality of second storage systems, and
wherein the plurality of identification information are used for storing the plurality of write data in second logical volumes of the plurality of second storage systems, if the plurality of identification information are designated by a plurality of another instructions sent from at least one the computer program and another computer program stored on a computer readable storage medium and implemented in at least one third computer, the third computer adaptive to be coupled to the plurality of second storage systems.

69. A computer program according to claim 68, wherein the code, controlling to send the plurality of identification information to the plurality of first storage systems, controls to send a plurality of new identification information to the plurality of first storage systems,
wherein the code, controlling to receive the plurality of reports from the plurality of first storage systems after sending the plurality of identification information, controls to receive a plurality of new reports from the plurality of first storage systems after sending the plurality of new identification information, and
wherein the code, controlling to send the plurality of instructions to the plurality of first storage systems after receiving the plurality of reports from the plurality of first storage systems, controls to send a plurality of new instructions to the plurality of first storage systems after receiving the plurality of new reports from the plurality of first storage systems, the plurality of new instructions instructing to cancel a plurality of deferment processes in which write processes of a plurality of new first write requests are deferred.

70. A computer program according to claim 68, wherein the code, controlling to send the plurality of identification information to the plurality of first storage systems, (A) controls to send a plurality of new identification information to the plurality of first storage systems,
wherein the code, controlling to receive the plurality of reports from the plurality of first storage systems after sending the plurality of identification information, (B) controls to receive a plurality of new reports from the plurality of first storage systems after sending the plurality of new identification information,
wherein the code, controlling to send the plurality of instructions to the plurality of first storage systems after receiving the plurality of reports from the plurality of first storage systems, (C) controls to send a plurality of new instructions to the plurality of first storage systems after receiving the plurality of new reports from the plurality of first storage systems, the plurality of new instructions instructing to cancel a plurality of deferment processes in which write processes of a plurality of new first write requests are deferred, and
wherein functions (A) to (C) of the wherein clauses are serially performed repeatedly.

71. A computer program according to claim 68, wherein the code, controlling to send the plurality of identification information to the plurality of first storage systems, controls to send one of the plurality of identification information to one of the plurality of first storage systems, wherein the code, controlling to receive the plurality of reports from the plurality of first storage systems after sending the plurality of identification information, controls to receive one of the plurality of reports from the one of the plurality of first storage systems after sending the one of the plurality of identification information, wherein the code, controlling to send the plurality of instructions to the plurality of first storage systems after receiving the plurality of reports from the plurality of first storage systems, controls to send one of the plurality of instructions to the one of the plurality of first storage systems after receiving the plurality of reports from the plurality of first storage systems, wherein the one of the plurality of identification information is related to a set of write data by the one of the plurality of first storage systems, the set of write data includes one of the plurality of write data correspond to one of the plurality of second write requests, wherein the one of the plurality of identification information and the set of write data are transferred from the one of the plurality of first storage systems to one of the plurality of second storage systems, and wherein the one of the plurality of identification information is used for storing the set of write data in the second logical volume of the one of the plurality of second storage systems, if the one of the plurality of identification information is designated by one of the plurality of another instructions.

72. A computer program according to claim 68, wherein each of the plurality of identification information are a marker number.

73. A computer program according to claim 69, wherein a value of one of the plurality of identification information is different from a value of one of the plurality of new identification information.

74. A computer program according to claim 68, wherein each of the plurality of identification information sent to the plurality of first storage systems includes same information.

75. A computer program according to claim 73, wherein each of the plurality of identification information sent to the plurality of first storage systems includes same information.

76. A computer program according to claim 68, wherein the plurality of identification information are stored in a plurality of memories of the plurality of first storage systems during the plurality of deferment processes.

77. A computer program according to claim 75, wherein one of the plurality of identification information is stored in a memory of one of the plurality of first storage systems during one of the plurality of deferment processes.

78. A computer program according to claim 68, wherein the plurality of identification information are used for establishing consistency between a plurality of replicated data stored in the second logical volumes of the plurality of second storage systems.

79. A computer program according to claim 68, wherein the plurality of identification information are used for storing the plurality of write data, stored in second storage areas of the plurality of second storage systems, in the second logical volumes of the plurality of second storage systems, if the plurality of identification information are designated by the plurality of another instructions.

80. A computer program according to claim 68, wherein the plurality of first storage systems and the plurality of second storage systems configure a plurality of pairs, each including the first logical volume of one of the plurality of first storage systems and the second logical volume of one of the plurality of second storage systems.

81. A computer program according to claim 68, further comprising:
code controlling to read the plurality of identification information from the plurality of second storage systems; and
code controlling to determine to designate the plurality of identification information.

82. A computer program according to claim 68, wherein one of the plurality of identification information relate to a marker.

83. A computer program stored on a computer readable storage medium and implemented in at least one first storage system, the at least one first storage system adaptive to be included in a plurality of first storage systems, the plurality of first storage systems each comprising a first control section for receiving data from one or more computers, one or more disk drives related to at least one first logical volume, and a first storage area for storing data to be transmitted to at least one of a plurality of second storage systems, the plurality of second storage systems each comprising a second control section, one or more second disk drives related to at least one second logical volume, and a second storage area for storing data received from at least one of the plurality of first storage systems, the computer program comprising:
code controlling to forming at least one of a plurality of pairs by using the first logical volume of the at least one first storage system and the second logical volume of the at least one of the plurality of second storage systems;
code controlling to receive a plurality of first write requests from the one or more computers and to store a plurality of first write data, which are received according to the plurality of first write requests and are stored in the first logical volume of the at least one of the plurality of first storage systems, in the first storage area of the at least one of the plurality of first storage systems;
code controlling to record an identification information received from a management software in the one or more computers and to transmit a report to the management software after recording the identification information;
code controlling to receive an instruction, for cancellation of a deferment process, from the management software after the plurality of first storage systems send a plurality of reports including the report to the management software, the deferment process being a process in which a plurality of second write requests received from the one or more computers are deferred; and
code controlling to transfer the plurality of first write data and the identification information to the at least one of the plurality of second storage systems, so that the plurality of second storage systems receive a plurality of write data including the plurality of first write data and a plurality of identification information including the identification information and control operations according to a plurality of another instructions sent from at least one of the management software and another management software in one or more other computers coupled to the plurality of second storage systems such that the plurality of write data are stored in second logical volumes of the plurality of second storage systems, if the plurality of identification information are designated by the plurality of another instructions.

84. A computer program according to claim 83, wherein code, controlling to receive the plurality of first write requests from the one or more computers and to store a plurality of first write data in the first storage area of the at least one of the plurality of first storage systems, controls to receive a plurality of new first write requests from the one or more computers and to store a plurality of new first write data, which are received according to the plurality of new first write requests and are stored in the first logical volume of the at least one of the plurality of first storage systems, in the first storage area of the at least one of the plurality of first storage systems, wherein code, controlling to record the identification information received from the management software in the one or more computers and to transmit the report to the management software after recording the identification information, controls to record a new identification information received from the management software in the one or more computers and to transmit a new report to the management software after recording the new identification information, wherein code, controlling to receive the instruction, for cancellation of the deferment process, from the management software, controls to receive a new instruction, for cancellation of a new deferment process, from the management software after the plurality of first storage systems send a plurality of new reports including the new report to the management software, the new deferment process being a process in which a plurality of new second write requests received from the one or more computers are deferred, and wherein code, controlling to transfer the plurality of first write data and the identification information to the at least one of the plurality of second storage systems, controls to transfer the plurality of new first write data and the new identification information to the at least one of the plurality of second storage systems, so that the plurality of second storage systems receive a plurality of new write data including the plurality of new first write data and a plurality of new identification information including the new identification information.

85. A computer program according to claim 83, wherein code, controlling to receive the plurality of first write requests from the one or more computers and to store a plurality of first write data in the first storage area of the at least one of the plurality of first storage systems, (A) controls to receive a plurality of new first write requests from the one or more computers and to store a plurality of new first write data, which are received according to the plurality of new first write requests and are stored in the first logical volume of the at least one of the plurality of first storage systems, in the first storage area of the at least one of the plurality of first storage systems;

wherein code, controlling to record the identification information received from the management software in the one or more computers and to transmit the report to the management software after recording the identification information, (B) controls to record a new identification information received from the management software in the one or more computers and to transmit a new report to the management software after recording the new identification information;

wherein code, controlling to receive the instruction, for cancellation of the deferment process, from the management software, (C) controls to receive a new instruction, for cancellation of a new deferment process, from the management software after the plurality of first storage systems send a plurality of new reports including the new report to the management software, the new deferment process being a process in which a plurality of new second write requests received from the one or more computers are deferred;

wherein code, controlling to transfer the plurality of first write data and the identification information to the at least one of the plurality of second storage systems, (D) controls to transfer the plurality of new first write data and the new identification information to the at least one of the plurality of second storage systems, so that the plurality of second storage systems receive a plurality of new write data including the plurality of new first write data and a plurality of new identification information including the new identification information; and wherein functions (A) to (D) of the wherein clauses are performed repeatedly.

86. A computer program according to claim 83, wherein each of the plurality of identification information are a marker number.

87. A computer program according to claim 84, wherein a value of one of the plurality of identification information is different from a value of one of the plurality of new identification information.

88. A computer program according to claim 83, wherein each of the plurality of identification information sent to the plurality of first storage systems includes same information.

89. A computer program according to claim 83, wherein each of the plurality of identification information sent to the plurality of first storage systems includes same information.

90. A computer program according to claim 83, wherein the identification information is stored in a memory of the at least one of the plurality of first storage systems during the deferment process.

91. A computer program according to claim 83, wherein the plurality of identification information are used for establishing consistency between a plurality of replicated data stored in the second logical volumes of the plurality of second storage systems.

92. A computer program according to claim 83, wherein the plurality of identification information are used for storing the plurality of write data, stored in second storage areas of the plurality of second storage systems, in the second logical volumes of the plurality of second storage systems, if the plurality of identification information are designated by the plurality of another instructions.

93. A computer program according to claim 83, wherein the identification information relates to a marker.

94. A remote copy system comprising:

a plurality of first storage systems, each comprising a first control section to be coupled to at least a computer and at least one first logical volume; and a plurality of second storage systems, each coupled to a first storage system and comprising a second control section, at least one second logical volume for storing data sent from said at least first storage system, wherein each of first control sections of the plurality of first storage systems stores a plurality of first write data from the computer, wherein each of the first control sections records an identification information received from a management software in the computer and transmits a completion report to the management software after recording the identification information, wherein each of the plurality of first storage systems receives a cancellation request for cancellation of a deferment process from the management software after each of the plurality of first storage systems sends the completion report to the management software, the deferment process being a process in which write processes of a plurality of second write requests received from the computers are deferred, wherein each of the first control sections transfers the plurality of first write data and the identification information to at least one of the plurality of second storage systems according to an asynchronous remote copy process, and wherein each of second control sections of the plurality of second storage systems receives the plurality of first write data and the identification information from at least one of the plurality of first storage systems; and wherein the plurality of first write data received from at least one of the plurality of first storage systems are stored in the second logical volume when the identification information is designated by another instruction sent from the management software or the other management software.

* * * * *